United States Patent
Bhaya et al.

(10) Patent No.: US 10,630,751 B2
(45) Date of Patent: Apr. 21, 2020

(54) SEQUENCE DEPENDENT DATA MESSAGE CONSOLIDATION IN A VOICE ACTIVATED COMPUTER NETWORK ENVIRONMENT

(71) Applicant: Google Inc., Mountain View, CA (US)

(72) Inventors: Gaurav Bhaya, Sunnyvale, CA (US); Robert Stets, Mountain View, CA (US)

(73) Assignee: Google LLC, Mountain View, CA (US)

( * ) Notice: Subject to any disclaimer, the term of this patent is extended or adjusted under 35 U.S.C. 154(b) by 167 days.

(21) Appl. No.: 15/395,725

(22) Filed: Dec. 30, 2016

(65) Prior Publication Data

US 2018/0191804 A1 Jul. 5, 2018

(51) Int. Cl.
*H04L 29/08* (2006.01)
*G06F 16/951* (2019.01)
(Continued)

(52) U.S. Cl.
CPC ........ *H04L 67/02* (2013.01); *G06F 16/90332* (2019.01); *G06F 16/951* (2019.01);
(Continued)

(58) Field of Classification Search
CPC ....... H04L 67/02; H04L 67/10; H04L 67/327; G06F 3/16; G06F 17/2765; G06F 17/30864; G06F 17/30976
See application file for complete search history.

(56) References Cited

U.S. PATENT DOCUMENTS

| 4,603,430 A | 7/1986 | Sacks |
| 5,542,107 A | 7/1996 | Kay |

(Continued)

FOREIGN PATENT DOCUMENTS

| CA | 2633177 A1 | 12/2009 |
| CN | 101410815 | 4/2009 |

(Continued)

OTHER PUBLICATIONS

Stackoverflow "Is it possible for a thread to deadlock itself", 2010, Stackoverflow, https://stackoverflow.com/questions/3493441/is-it-possible-for-a-thread-to-deadlock-itself (Year: 2010).*

(Continued)

*Primary Examiner* — Glenford J Madamba
*Assistant Examiner* — Abderrahmen Chouat
(74) *Attorney, Agent, or Firm* — Foley & Lardner LLP; James De Velis

(57) ABSTRACT

Systems and methods to combine multiple voice activated audio input data packets that indicate sequence dependent operations are provided. A natural language processor component can receive first and second input audio signal from a client computing device, and can identify respective requests and corresponding trigger keywords. A direct action application programming interface ("API") can generate respective action data structures, and can construct respective data transmissions including the respective action data structures. A thread optimization component can obtain data packets of the first data transmission, and can obtain data packets of the second data transmission. The thread optimization component can determine, based on a heuristic technique applied to the data packets of the respective data transmissions a sequence dependency parameter. The thread optimization component can merge, based on a comparison of the sequence dependency parameter with a threshold, the first and second data transmissions into a single thread.

19 Claims, 5 Drawing Sheets

(51) Int. Cl.
*G06F 16/9032* (2019.01)
*G10L 15/26* (2006.01)
*G06F 40/279* (2020.01)

(52) U.S. Cl.
CPC ............ *G06F 40/279* (2020.01); *G10L 15/26* (2013.01); *H04L 67/10* (2013.01); *H04L 67/327* (2013.01)

(56) References Cited

U.S. PATENT DOCUMENTS

| | | | |
|---|---|---|---|
| 5,581,686 A | 12/1996 | Koppolu et al. | |
| 5,608,727 A | 3/1997 | Perreault et al. | |
| 6,275,806 B1 | 8/2001 | Pertrushin | |
| 6,684,249 B1 | 1/2004 | Frerichs et al. | |
| 6,771,390 B1 | 8/2004 | Weidlich | |
| 6,857,007 B1 | 2/2005 | Bloomfield | |
| 7,003,729 B1 | 2/2006 | Rajala et al. | |
| 7,219,309 B2 | 5/2007 | Kaasila et al. | |
| 7,222,306 B2 | 5/2007 | Kaasila et al. | |
| 7,337,392 B2 | 2/2008 | Lue | |
| 7,853,255 B2 | 12/2010 | Karaoguz et al. | |
| 7,865,404 B2 | 1/2011 | Peckover | |
| 7,877,696 B2 | 1/2011 | Telek et al. | |
| 7,900,137 B2 | 3/2011 | Ivarsoy et al. | |
| 7,925,138 B2 | 4/2011 | Ando et al. | |
| 7,962,522 B2 | 6/2011 | Norris, III | |
| 7,964,841 B2 | 6/2011 | Imai | |
| 8,151,183 B2 | 4/2012 | Chen et al. | |
| 8,195,133 B2 | 6/2012 | Ramer et al. | |
| 8,208,788 B2 | 6/2012 | Ando et al. | |
| 8,265,220 B2 | 9/2012 | Komaili et al. | |
| 8,302,000 B2 | 10/2012 | Uehori | |
| 8,386,386 B1 | 2/2013 | Zhu | |
| 8,402,379 B2 | 3/2013 | Barak | |
| 8,413,070 B1 | 4/2013 | Castrucci et al. | |
| 8,448,074 B2 | 5/2013 | Forutanpour et al. | |
| 8,453,051 B1 | 5/2013 | Weiss et al. | |
| 8,510,237 B2 | 8/2013 | Cascaval et al. | |
| 8,756,523 B2 | 6/2014 | Chiba et al. | |
| 8,903,716 B2 | 12/2014 | Chen et al. | |
| 8,914,753 B2 | 12/2014 | Miyata | |
| 8,938,672 B2 | 1/2015 | Desantis et al. | |
| 9,014,483 B2 | 4/2015 | Ito et al. | |
| 9,164,966 B1 | 10/2015 | Llach et al. | |
| 9,183,319 B2 | 11/2015 | Joel et al. | |
| 9,542,956 B1 | 1/2017 | Nostrant | |
| 9,703,757 B2 | 7/2017 | Rimmer et al. | |
| 10,431,209 B2 | 10/2019 | Bhaya et al. | |
| 2001/0016034 A1* | 8/2001 | Singh | G06F 17/30867 379/88.17 |
| 2002/0178005 A1 | 11/2002 | Wood-Eyre | |
| 2003/0023656 A1* | 1/2003 | Hutchison | G06F 9/524 718/100 |
| 2004/0056894 A1 | 3/2004 | Zaika et al. | |
| 2004/0098251 A1 | 5/2004 | Vainio et al. | |
| 2004/0141016 A1 | 7/2004 | Fukatsu et al. | |
| 2004/0177316 A1 | 9/2004 | Layzell et al. | |
| 2005/0060709 A1* | 3/2005 | Kanai | G06F 9/45537 718/100 |
| 2005/0086345 A1 | 4/2005 | Philyaw et al. | |
| 2006/0103667 A1 | 5/2006 | Amit et al. | |
| 2006/0242017 A1 | 10/2006 | Libes et al. | |
| 2006/0253796 A1 | 11/2006 | Wang et al. | |
| 2007/0005433 A1 | 1/2007 | Lee et al. | |
| 2007/0019549 A1 | 1/2007 | Okabe | |
| 2007/0097975 A1 | 5/2007 | Rakers et al. | |
| 2007/0118797 A1 | 5/2007 | Layzell | |
| 2007/0127688 A1 | 6/2007 | Doulton | |
| 2008/0037656 A1* | 2/2008 | Hannuksela | H04N 21/23614 375/240.26 |
| 2008/0114747 A1 | 5/2008 | Goller et al. | |
| 2008/0147388 A1 | 6/2008 | Singh | |
| 2008/0235574 A1 | 9/2008 | Telek et al. | |
| 2009/0085921 A1 | 4/2009 | Do et al. | |
| 2009/0132578 A1 | 5/2009 | Parikh et al. | |
| 2009/0183065 A1 | 7/2009 | Endo et al. | |
| 2009/0279108 A1 | 11/2009 | Hoshi et al. | |
| 2009/0300120 A1 | 12/2009 | Schmidt | |
| 2009/0327032 A1 | 12/2009 | Gunawardana et al. | |
| 2010/0011316 A1 | 1/2010 | Sar et al. | |
| 2010/0082780 A1 | 4/2010 | Muilenburg et al. | |
| 2010/0199209 A1 | 8/2010 | Sueoka et al. | |
| 2010/0199210 A1 | 8/2010 | Harada et al. | |
| 2010/0199211 A1 | 8/2010 | Igawa et al. | |
| 2010/0325430 A1* | 12/2010 | Denninghoff | H04L 67/14 713/160 |
| 2011/0093605 A1 | 4/2011 | Choudhury et al. | |
| 2011/0258562 A1 | 10/2011 | Zhu et al. | |
| 2012/0060111 A1 | 3/2012 | Kim | |
| 2012/0158490 A1 | 6/2012 | Neumeyer et al. | |
| 2012/0159314 A1 | 6/2012 | Schrier et al. | |
| 2012/0165009 A1* | 6/2012 | Oba | H04W 36/005 455/426.1 |
| 2012/0265528 A1 | 10/2012 | Gruber et al. | |
| 2013/0007602 A1 | 1/2013 | Dougherty et al. | |
| 2013/0021377 A1 | 1/2013 | Doll | |
| 2013/0024757 A1 | 1/2013 | Doll et al. | |
| 2013/0089098 A1* | 4/2013 | Mital | H04L 69/22 370/394 |
| 2013/0117022 A1 | 5/2013 | Chen et al. | |
| 2013/0174047 A1 | 7/2013 | Sivakumar et al. | |
| 2013/0275164 A1 | 10/2013 | Gruber et al. | |
| 2013/0298085 A1 | 11/2013 | Kritt et al. | |
| 2013/0304758 A1 | 11/2013 | Gruber et al. | |
| 2013/0305144 A1 | 11/2013 | Jackson et al. | |
| 2013/0305145 A1 | 11/2013 | Jackson et al. | |
| 2014/0033228 A1 | 1/2014 | Lucash | |
| 2014/0108941 A1 | 4/2014 | Joel et al. | |
| 2014/0180796 A1 | 6/2014 | Sas et al. | |
| 2014/0222436 A1 | 8/2014 | Binder et al. | |
| 2014/0258849 A1 | 9/2014 | Chung et al. | |
| 2014/0281918 A1 | 9/2014 | Wei et al. | |
| 2015/0019957 A1 | 1/2015 | Ying et al. | |
| 2015/0066479 A1 | 3/2015 | Pasupalak et al. | |
| 2015/0088970 A1 | 3/2015 | Wei et al. | |
| 2015/0095768 A1 | 4/2015 | Rimmer et al. | |
| 2015/0242908 A1 | 8/2015 | Kobyakov et al. | |
| 2015/0350598 A1 | 12/2015 | Yang et al. | |
| 2015/0379670 A1* | 12/2015 | Koker | G06T 1/20 345/502 |
| 2016/0092699 A1 | 3/2016 | Riva et al. | |
| 2016/0274864 A1 | 9/2016 | Zomet et al. | |
| 2016/0308981 A1* | 10/2016 | Cortes Gomez | H04L 67/16 |
| 2016/0357717 A1 | 12/2016 | Metz et al. | |
| 2017/0068423 A1* | 3/2017 | Napolitano | G06F 3/04842 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0169817 A1 | 6/2017 | Vanblon et al. | |
| 2017/0250936 A1* | 8/2017 | Rosenberg | H04L 51/18 |
| 2017/0300456 A1 | 10/2017 | Rimmer et al. | |
| 2017/0315962 A1 | 11/2017 | Kovar | |
| 2017/0358301 A1 | 12/2017 | Raitio et al. | |
| 2018/0190271 A1 | 7/2018 | Bhaya et al. | |
| 2018/0191798 A1 | 7/2018 | Zhu et al. | |

FOREIGN PATENT DOCUMENTS

| | | |
|---|---|---|
| EP | 1 965 564 | 9/2008 |
| EP | 2 814 244 A1 | 12/2014 |
| JP | 2005-043959 | 2/2005 |
| JP | 2006-146939 A | 6/2006 |
| JP | 2011-066623 | 3/2011 |
| JP | 2012-073863 A | 4/2012 |
| JP | 2014-132464 | 7/2014 |
| JP | 2014-531076 | 11/2014 |
| KR | 2014-0143768 A | 12/2017 |
| WO | WO-2004/084109 | 9/2004 |
| WO | WO-2011/065564 A1 | 6/2011 |
| WO | WO-2011/088053 | 7/2011 |
| WO | WO-2012/002351 A1 | 1/2012 |

(56) References Cited

FOREIGN PATENT DOCUMENTS

| | | |
|---|---|---|
| WO | WO-2014/014745 | 1/2014 |
| WO | WO-2015/179510 A1 | 11/2015 |
| WO | WO-2016/054230 | 4/2016 |
| WO | WO-2016/111881 | 7/2016 |

OTHER PUBLICATIONS

Stackoverflow "what is deadlock", 2008, Stackoverflow, https://stackoverflow.com/questions/34512/what-is-a-deadlock# (Year: 2008).*
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
Close, "Amazon Echo Will Give You These Deals If You Order Through Alexa This Weekend," Web Article, Nov. 18, 2016, Time.com (2 pages).
Cook, "A Siri for advertising: These mobile ads talk back to you," Web Article, Apr. 1, 2013, Geekwire.com (7 pages).
Golgowski, Nina, "This Burger King Ad Is Trying to Control Your Google Home Device", Apr. 12, 2017, 7 pages.
Larson, Selena "Google Home Now Recognizes your Individual Voice" dated Apr. 20, 2017, 3 pages.
Purcher, Jack "Today Google Home's Virtual Assistant Can Learn its Owner's Voice for Security Reason's like Apple's Patent Pending Idea" Apr. 20, 2017, 4 pages.
Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
"Walmart and Google to offer voice-enabled shopping", BBC News, Aug. 23, 2017.
Broussard, Mitchel, "Chatbot-Like Siri Patent Includes Intelligent Image, Video, and Audio Recognition Within Messages", May 11, 2017, 11 pages.
Chen, Yilun Lulu, "Alibaba Challenges Google, Amazon With New Echo-Like Device", Bloomberg, Jul. 5, 2017, 3 pages.
Crist, Ry, "Logitech Harmony's Alexa Skill just got a whole lot better", cnet, Jul. 13, 2017 (2 pages).
European Search Report on EP 14849752, dated Jun. 4, 2017, 8 pages.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Google Developers Newsletter "Google Assistant SDK", developers.google.com, retrieved on Jul. 12, 2017, 2 pages.
Gurma, Mark and Webb, Alex, "Apple is Manufacturing a Siri Speaker to Outdo Google and Amazon", Bloomberg, May 31, 2017, 3 pages.
Hardwick, Tim, "Facebook Smart Speaker Coming Next Year With 15-inch Touch Panel", MacRumors, Jul. 25, 2017 (5 pages).
International Patent No. PCT/US2014/057247,International Search Report and Written Opinion dated Dec. 30, 2014, 17 pages.
International Preliminary Report on Patentability on PCT/US2014/057247 dated Apr. 14, 2016, 9 pgs.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017, 3 pages.
Lardinois, Frederic, Google Launches New Ad Unit for Responsive Sites, Google AdSense, http://techcrunch.com/2013/07/31/google-launches-new-ad-unit-for-responsive-sites/, Jul. 31, 2013, 3 pgs.
Lee, Dave, "The five big announcements from Google I/O", BBC, May 18, 2017, 11 pages.
Notice of Allowance on U.S. Appl. No. 13/222,380 dated Oct. 7, 2013.
Notice of Allowance on U.S. Appl. No. 14/176,845 dated Aug. 6, 2015.
Office Action on U.S. Appl. No. 13/222,380 dated Apr. 3, 2013.
Office Action on U.S. Appl. No. 13/222,380 dated Aug. 16, 2013.
Office Action on U.S. Appl. No. 14/176,845 dated Apr. 2, 2015.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Sablich, Justin, "Planning a Trip With the Help of Google Home", New York Times, dated May 31, 2017, 6 pages.
Smith, Dave, "The Amazon Echo got 2 incredibly useful features thanks to a new update", Business Insider, Jun. 1, 2017, 2 pages.
U.S. Notice of Allowance on U.S. Appl. No. 14/048,921 dated Mar. 13, 2017.
U.S. Notice of Allowance on U.S. Appl. No. 14/870,725 dated Sep. 1, 2016.
U.S. Office Action on U.S. Appl. No. 14/870,725 dated May 12, 2016.
U.S. Office Action on U.S. Appl. No. 14/048,921 dated Jul. 20, 2016.
U.S. Office Action on U.S. Appl. No. 14/048,921 dated Nov. 25, 2015.
U.S. Office Action on U.S. Appl. No. 15/361,668 dated Aug. 23, 2017.
U.S. Office Action on U.S. Appl. No. 15/361,668 dated Aug. 23, 2017, 6 pages.
Willens, Max, "For publishers, Amazon Alexa holds promise but not much money (yet)", Digiday, Jul. 6, 2017, 5 pages.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Search Report and Written Opinion for PCT Appl. Ser. No. PCT/US2017/049780 dated Nov. 28, 2017, 11 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.

(56) References Cited

OTHER PUBLICATIONS

Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "I'm sorry to hear that: Why training Siri to be a therapist won't be easy", CBC News, Sep. 24, 2017, 3 pages.
Unknown Author, "Dolphin' attacks fool Amazon, Google voice assistants", BBC News, Sep. 7, 2017, 8 pages.
U.S. Office Action on U.S. Appl. No. 15/361,668 dated Jan. 4, 2018, 7 pages.
Buckland et al., "Amazon's Alexa Takes Open-Source Route to Beat Google Into Cars", Bloomberg, Feb. 27, 2018, 6 pages.
CN Second Office Action dated Aug. 30, 2018 in Chinese Patent Application No. 201480054057.8 with English Translation.
International Search Report and Written Opinion for PCT Appl. Ser. No. PCT/US2017/49766 dated Nov. 24, 2017, 11 pages.
Non-Final Office Action on U.S. Appl. No. 15/621,806 dated Sep. 25, 2018.
Notice of Allowance on U.S. Appl. No. 15/361,668 dated Jun. 14, 2018.
Notice of Allowance on U.S. Appl. No. 15/395,694 dated Dec. 12, 2108.
Notice of Reasons for Rejections for application No. 2016-545216 dated Aug. 13, 2018.
Notification of Transmittal of The International Preliminary Report on Patentability for application No. PCT/US2017/049780 dated Sep. 10, 2018.
Office Action for Chinese Appl. Ser. No. 201480054057.8 dated Jan. 17, 2018, 41 pages.
U.S. Notice of Allowance for U.S. Appl. No. 15/361,668 dated May 7, 2018.
U.S. Notice of Allowance for U.S. Appl. No. 15/361,668 dated Feb. 9, 2018, 7 pages.
U.S. Notice of Allowance on U.S. Appl. No. 15/361,668 dated May 7, 2018.
U.S. Office Action on U.S. Appl. No. 15/395,694 dated Aug. 9, 2018.
CN Third Office Action dated Mar. 5, 2019 in Chinese Patent Application No. 201480054057.8.
Fiegerman, Seth, "Alexa, shut up: Raging Against the New Machines", CNN, Aug. 22, 2017 (6 pages).
Johnson, Khari, "Amazon's Alexa Wants to Learn More About Your Feelings", VentureBeat, Dec. 22, 2017 (4 pages).
JP First Office Action dated Feb. 25, 2019 in Japanese Patent Application No. 2017-556911.
JP First Office Action dated Feb. 8, 2019 in Japanese Patent Application No. 2017-556886.
Koetsier, John, "This AI Can Recognize Anger, Awe, Desire, Fear, Hate, Grief, Love . . . By How You Touch Your Phone", Consumer Tech, Aug. 31, 2018 (4 pages).
KR Office Action dated Feb. 21, 2019 in Korean Patent Application No. 10-2017-7031385.
KR Office Action dated Jan. 21, 2019 in Korean Patent Application No. 10-2017-7031379.
Liberatore, Stacy, "Now Alexa knows when you're angry: Amazon's virtual assistant will analyse emotions in user's voices", DailyMail.com, Jun. 13, 2016 (33 pages).
Medeiros, J. "Virtual Assistants Can Detect Your Bad Mood and Do Something About it", Voice Summit Blog, Dec. 1, 2018 (7 pages).
Notice of Allowance on U.S. Appl. No. 15/395,694 dated Mar. 20, 2019.
Notice of Allowance on U.S. Appl. No. 15/621,806 dated Mar. 21, 2019.
Robertson, Katie, "Amazon Bets on an Empathetic Alexa", The New York Times, Mar. 3, 2019 (3 pages).
Non-Final Office Action on U.S. Appl. No. 15/638,312 dated May 16, 2019.
Foreign Search Report on EP Appln. Ser. No. 19187924.6 dated Sep. 3, 2019 (6 pages).
JP Notice of Allowance for Appl. Ser. No. 2017-556886 dated May 27, 2019 (6 pages).
Non-Final Office Action on U.S. Appl. No. 15/590,861 dated Jul. 25, 2019 (13 pages).
Notice of Allowance on U.S. Appl. No. 15/621,806 dated Aug. 13, 2019 (2 pages).
Notice of Allowance on U.S. Appl. No. 15/621,806 dated Sep. 17, 2019 (2 pages).
Notice of Allowance on U.S. Appl. No. 15/638,312 dated Sep. 17, 2019 (8 pages).
PCT International Preliminary Report on Patentability for Appl. Ser. No. PCT/US2017/049766 dated Mar. 13, 2019 (7 pages).
U.S. Notice of Allowance for U.S. Appl. No. 15/395,694 dated Jun. 18, 2019 (8 pages).
U.S. Notice of Allowance for U.S. Appl. No. 15/621,806 dated Jun. 4, 2019 (5 pages).
Final Office Action on U.S. Appl. No. 15/590,861 dated Nov. 22, 2019 (14 pages).
Non-Final Office Action on U.S. Appl. No. 16/544,367 dated Oct. 31, 2019 (11 pages).
Notice of Allowance for KR Appl. No. 10-2017-7031385 dated Jun. 19, 2019 (3 pages).
Notice of Allowance on CN Appln. Ser. No. 201480054057.8 dated Aug. 30, 2019 (4 pages).
Notice of Allowance on JP Appln. Ser. No. 2017-556911 dated Jun. 10, 2019 (5 pages).
Notice of Allowance on JP Appln. Ser. No. JP 2016-545216 dated Feb. 4, 2019 (5 pages).
Notice of Allowance on KR Appln. Ser. No. 10-2017-7031379 dated Jul. 31, 2019 (3 pages).
Notice of Allowance for U.S. Appl. No. 15/638,312 dated Jan. 2, 2020 (8 pages).

\* cited by examiner

SEQUENCE DEPENDENT DATA MESSAGE CONSOLIDATION IN A VOICE ACTIVATED COMPUTER NETWORK ENVIRONMENT

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

At least one aspect is directed to a system to combine multiple voice activated audio input data packets that indicate sequence dependent operations. A natural language processor component executed by a data processing system can receive, via an interface of the data processing system, data packets comprising a first input audio signal detected by a sensor of a client computing device. The natural language processor component can parse the first input audio signal to identify a first request and a first trigger keyword corresponding to the first request. A direct action application programming interface ("API") of the data processing system can generate, based on the first trigger keyword and in response to the first request, a first action data structure. The direct action API can construct a first data transmission including the first action data structure to establish a first communication session between a first service provider computing device and the client computing device, data packets of the first communication session routed from the client computing device to the first service provider computing device via the data processing system. The natural language processor component can receive, via the interface of the data processing system, data packets comprising a second input audio signal detected by the sensor of the client computing device, and can parse the second input audio signal to identify a second request and a second trigger keyword corresponding to the second request. The direct action API can generate, based on the second trigger keyword and in response to the second request, a second action data structure. The direct action API can construct a second data transmission including the second action data structure to establish a second communication session between a second service provider computing device and the client computing device, data packets of the second communication session routed from the client computing device to the second service provider computing device via the data processing system. A thread optimization component executed by the data processing system can obtain data packets of the first data transmission, and can obtain data packets of the second data transmission. The thread optimization component can determine, based on a heuristic technique applied to the data packets of the first data structure and the data packets applied to the second data structure, a sequence dependency parameter. The thread optimization component can merge, based on a comparison of the sequence dependency parameter with a threshold, the first data transmission with the second action data transmission into a single thread.

At least one aspect is directed to a method of managing multiple voice activated audio input data communications that indicate sequence dependent operations. The method can include receiving, by a natural language processor component executed by a data processing system, via an interface of the data processing system, data packets comprising a first input audio signal detected by a sensor of a client computing device. The method can include identifying, by the natural language processor component, from the first input audio signal, a first request and a first trigger keyword corresponding to the first request. The method can include generating, by a direct action application programming interface ("API") of the data processing system, based on the first trigger keyword and in response to the first request, a first action data structure. The method can include constructing a first data transmission including the first action data structure for a first communication session between a first service provider computing device and the client computing device, data packets of the first communication session routed from the client computing device to the first service provider computing device via the data processing system. The method can include receiving, by the natural language processor component, via the interface of the data processing system, data packets comprising a second input audio signal detected by the sensor of the client computing device, and parsing, by the natural language processor component, the second input audio signal to identify a second request and a second trigger keyword corresponding to the second request. The method can include generating, by the direct action API, based on the second trigger keyword and in response to the second request, a second action data structure. The method can include constructing a second data transmission including the second action data structure for a second communication session between a second service provider computing device and the client computing device, data packets of the second communication session routed from the client computing device to the second service provider computing device via the data processing system. The method can include obtaining, by a thread optimization component executed by the data processing system, data of the first data transmission, and data of the second data transmission. The method can include determining, based on a heuristic technique applied to the data of the first data transmission and applied to the data of the second data transmission, a sequence dependency parameter. The method can include associating, based on a comparison of the sequence dependency parameter with a threshold, the first action data structure and the second action data structure with a single thread.

At least one aspect is directed to a computer readable storage medium storing instructions that when executed by one or more data processors, cause the one or more data processors to perform operations to manage multiple voice activated audio input data communications that indicate sequence dependent operations. The operations can include receiving, by a natural language processor component executed by a data processing system, via an interface of the data processing system, data packets comprising a first input audio signal detected by a sensor of a client computing device. The operations can include identifying, by the natural language processor component, from the first input audio signal, a first request and a first trigger keyword corresponding to the first request. The operations can include generating, by a direct action application programming interface ("API") of the data processing system, based on the first trigger keyword and in response to the first request, a first action data structure. The operations can include constructing a first data transmission including the first action data structure for a first communication session between a first service provider computing device and the client computing device, data packets of the first communication session routed from the client computing device to the first service provider computing device via the data processing system. The operations can include receiving, by the natural language processor component, via the interface of the data processing system, data packets comprising a second input audio signal detected by the sensor of the client computing device, and parsing, by the natural language processor component, the second input audio signal to identify a second request and a second trigger keyword corresponding to the second request. The operations can include generating, by the direct action API, based on the second trigger keyword and in response to the second request, a second action data structure. The operations can include constructing a second data transmission including the second action data structure for a second communication session between a second service provider computing device and the client computing device, data packets of the second communication session routed from the client computing device to the second service provider computing device via the data processing system. The operations can include obtaining, by a thread optimization component executed by the data processing system, data packets of the first data transmission, and data packets of the second data transmission. The operations can include determining, based on a heuristic technique applied to the data packets of the first data structure and the data packets applied to the second data structure, a sequence dependency parameter. The operations can include associating, based on the sequence dependency parameter, the first action data structure and the second action data structure with a single thread.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
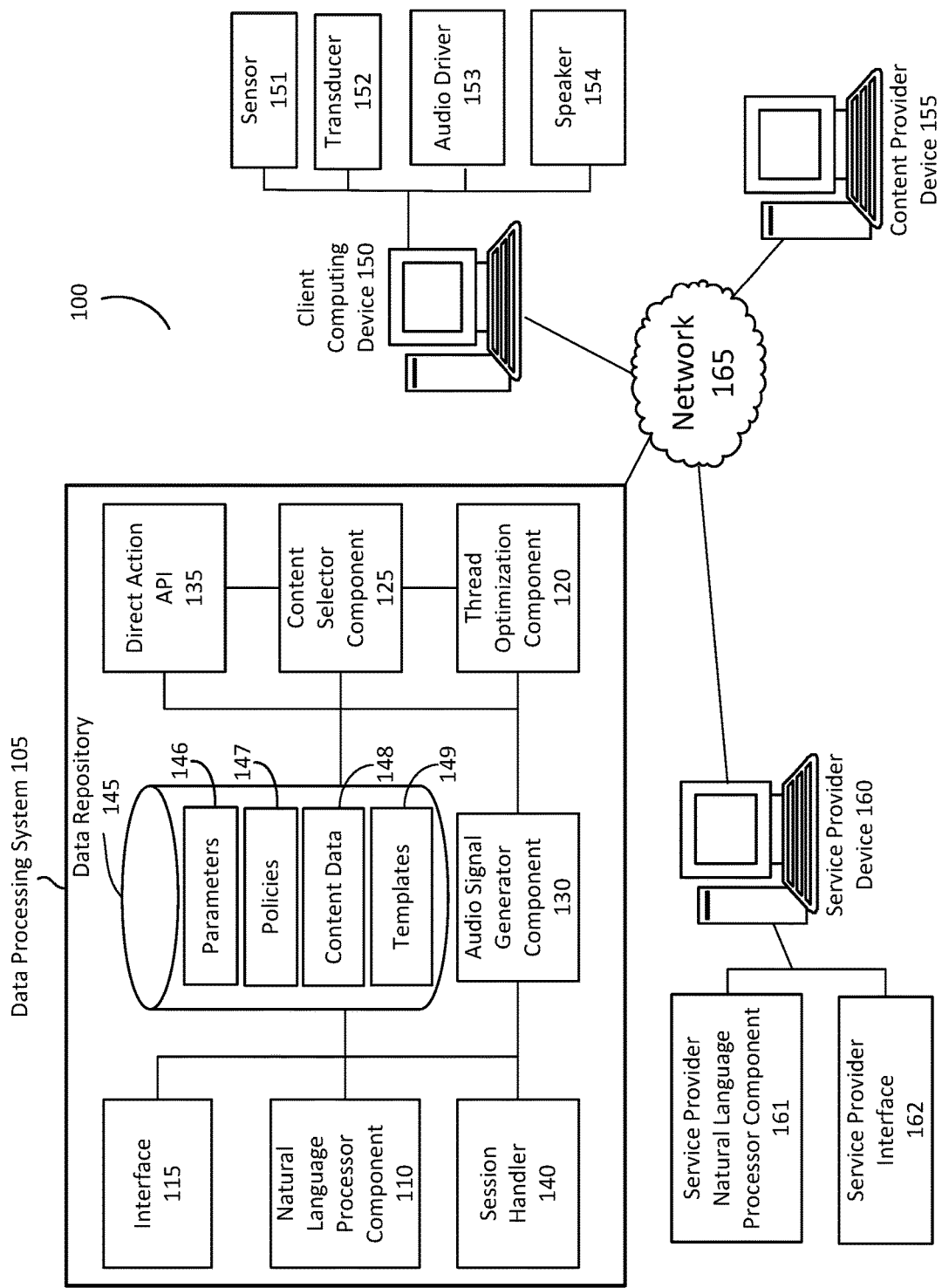
FIG. 1 depicts a system to combine multiple voice activated audio input data packets that indicated sequence dependent operations in a voice activated computer network environment.

Following below are more detailed descriptions of various concepts related to, and implementations of, methods, apparatuses, and systems to optimize processing of multiple voice activated audio input data packets in a voice activated computer network environment. The various concepts introduced above and discussed in greater detail below may be implemented in any of numerous ways.

Systems and methods of the present disclosure relate generally to a data processing system that optimizes or dynamically adjusts multiple voice activated packet (or other protocol) based input audio signals via packet based transmissions in a voice activated computer network environment. The data processing system can improve the efficiency and effectiveness of data packet transmission over one or more computer networks by, for example, extracting information from input audio signals to generate multiple corresponding action data structures. The action data structures can be constructed for transmission during communication sessions between the data processing system and multiple different service provider computing devices. From, for example, the packets of different action data structures, the data processing system can determine at least one sequence dependency parameter. The sequence dependency parameters can indicate an order of operation of actions indicated by the action data structures or their corresponding data transmissions. Based on the sequence dependency parameters, the data processing system can merge or combine multiple action data transmissions into a single thread.

The single thread can include sequence dependent operations of multiple action data structures. The data processing system can provide the single thread or portions thereof (e.g., at least one packet based data structure) to multiple service provider computing devices to accomplish actions indicated by the single thread. The data processing system can also provide the single thread or portions thereof to at least one content provider computing device to obtain content items associated with the single thread. The service provider computing devices and the content provider computing devices can communicate, via or bypassing the data processing system, with at least one client computing device (e.g., a source of the audio input signals) to render audio output to accomplish the actions indicated by the thread, or to render content items at the client computing device.

By merging or otherwise consolidating multiple action data structures into a single thread, and by identifying sequence dependent operations indicated by the single thread, the processing, power, and memory utilization requirements of the data processing system are reduced, relative to individual processing of multiple action data structures without such consolidation and sequence dependency identification. For example, asynchronous or out-of-sequence processing of operations of individual action data structures can cause untimely, premature, or unnecessary data packet communications via established communication sessions between the data processing system and the service provider or content provider computing devices. This wastes bandwidth, and can cause unnecessary processing operations to occur by the data processing system as well as by the service provider or content provider computing devices, which wastes computing resources of multiple computing devices.

Based on identified sequence dependent operations in the single thread, the data processing system can temporarily or permanently skip initial operations of a set of sequence dependent operations and can instead proceed to an operation that corresponds to a later-in-time or final operation. By bypassing packet or other protocol based data transmissions that correspond to an early operation of a plurality of sequence dependent operations, and instead proceeding directly to packet based data transmissions for later stage operations in a sequence of operations the data processing system can reduce, delay, or eliminate data processing associated with the early stage operations. This saves processing power and other computing resources such as memory, reduces electrical power consumption by the data processing system and the reduced data transmissions via the computer network reduces bandwidth requirements and usage of the data processing system.

The systems and methods described herein can include a data processing system that receives a first input audio signal. From the first input audio signal, the data processing system can identify a first request and a first trigger keyword corresponding to the request. Based on the first trigger keyword or the first request, the data processing system can generate a first action data structure, and can construct or prepare a first data transmission including the first action data structure. The first data transmission can be routed as a data packet or other protocol based transmission from the client computing device to at least one first service provider computing device as part of a first communication session.

The data processing system can receive a second input audio signal. From the second input audio signal, the data processing system can identify a second request and a second trigger keyword corresponding to the request. Based on the second trigger keyword or the second request, the data processing system can generate a second action data structure, and can construct or prepare a second data transmission including the second action data structure. The second data transmission can be routed as a data packet or other protocol based transmission from the client computing device to at least one second service provider computing device as part of a second communication session. The first and second service provider computing devices can correspond to different entities that do not communicate with each other via the data processing system.

The data processing system can obtain data packets of the first and second transmissions (e.g., from the first and second data structures) and can extract information from the data packets to determine at least one sequence dependency parameter. The sequence dependency parameter can indicate a sequence of operations for actions of the first and second data structures. The data processing system can compare the sequence dependency parameter to a threshold (e.g., a rule, policy, or value) and based on the comparison the data processing system can merge the first and second data transmissions (or associated action data structures) into a single thread. The single thread can indicate actions of the first and second (or more) action data structures, and can indicate a sequence or order of these actions, as well as sequence dependencies where for example a second action cannot (or is not scheduled to) begin until after a first action is complete.

The data processing system can reorder, skip, or at least temporarily bypass operations related to some actions of the single thread, based for example on sequence dependencies or based on input received from the client computing device. This can be done before or without performing at least some of the data processing operations based on the bypassed action. Bypassing the processing operations for a first action can cause data related to a second action to identified, transmitted and rendered with less data processing and less electrical power usage than would be the case without the bypass.

FIG. 1 depicts an example system 100 to optimize processing of multiple action data structures having sequence dependent operations in a voice activated data packet (or other protocol) based computer network environment. The system 100 can include at least one data processing system 105, for example as part of a voice activated communication or planning system. The data processing system 105 can include at least one server having at least one processor. For example, the data processing system 105 can include a plurality of servers located in at least one data center or server farm. The data processing system 105 can determine, from an audio input signal a request and a trigger keyword associated with the request. Based on the request and trigger keyword the data processing system 105 can generate an action data structure. The action data structure can indicate at least one action that corresponds to the input audio signal. The data processing system 105 can receive multiple separate input audio signals, and for each input audio signal can create a respective data structure. The data processing system 105 can construct or otherwise prepare data transmissions for each data structure to transmit the data structures during respective communication sessions with respective other computing devices (e.g., servicer provider computing devices or content provider computing devices). The data processing system 105 can determine, from the action data structures or corresponding data transmissions, one or more sequence dependency parameter. Based on the sequence dependency parameter, the data processing system 105 can merge multiple data transmissions (or corresponding action data structures) into a single thread. The single thread can indicate actions from at least two action data structures, as well as orders of operations or sequence dependencies of the actions.

The data processing system 105 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 105 can include servers in a data center that are stored in one or more high-density rack systems, along with associated storage systems, located for example in an enterprise data center. The data processing system 105 with consolidated servers in this way can improve system manageability, data security, the physical security of the system, and system performance by locating servers and high performance storage systems on localized high performance networks. Centralization of all or some of the data processing system 105 components, including servers and storage systems, and coupling them with advanced system management tools allows more efficient use of server resources, which saves power and processing requirements and reduces bandwidth usage.

The data processing system 105 can include at least one natural language processor (NLP) component 110, at least one interface 115, at least one thread optimization component 120, at least one content selector component 125, at least one audio signal generator component 130, at least one direct action application programming interface (API) 135, at least one session handler component 140, and at least one data repository 145. The NLP component 110, interface 115, thread optimization component 120, content selector component 125, audio signal generator component 130, direct action API 135, and session handler component 140 can each include at least one processing unit, server, virtual server, circuit, engine, agent, appliance, or other logic device such as programmable logic arrays configured to communicate with the data repository 145 and with other computing devices (e.g., the client computing device 150, the content provider computing device 155, or the service provider computing device 160) via the at least one computer network 165. The network 165 can include computer networks such as the internet, local, wide, metro or other area networks, intranets, satellite networks, other computer networks such as voice or data mobile phone communication networks, and combinations thereof.

The network 165 can include or constitute a display network, e.g., a subset of information resources available on the internet that are associated with a content placement or search engine results system, or that are eligible to include third party content items as part of a content item placement campaign. The network 165 can be used by the data processing system 105 to access information resources such as web pages, web sites, domain names, or uniform resource locators that can be presented, output, rendered, or displayed by the client computing device 150. For example, via the network 165 a user of the client computing device 150 can access information or data provided by the content provider computing device 155 or the service provider computing device 160.

The network 165 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 165 can include a wireless link, such as an infrared channel or satellite band. The topology of the network 165 may include a bus, star, or ring network topology. The network 165 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 150, the content provider computing device 155, and the service provider computing device 160 can each include at least one logic device such as a computing device having a processor to communicate with each other or with the data processing system 105 via the network 165. The client computing device 150, the content provider computing device 155, and the service provider computing device 160 can each include at least one server, processor or memory, or a plurality of computation resources or servers located in at least one data center. The client computing device 150, the content provider computing device 155, and the service provider computing device 160 can each include at least one computing device such as a desktop computer, laptop, tablet, personal digital assistant, smartphone, portable computer, server, thin client computer, virtual server, or other computing device.

The client computing device 150 can include at least one sensor 151, at least one transducer 152, at least one audio driver 153, and at least one speaker 154. The sensor 151 can include a microphone or audio input sensor. The transducer 152 can convert the audio input into an electronic signal. The audio driver 153 can include a script or program executed by one or more processors of the client computing device 150 to control the sensor 151, the transducer 152 or the audio driver 153, among other components of the client computing device 150 to process audio input or provide audio output. The speaker 154 can transmit the audio output signal.

The client computing device 150 can be associated with an end user that enters voice queries as audio input into the client computing device 150 (via the sensor 151) and receives audio output in the form of a computer generated voice that can be provided from the data processing system 105 (or the content provider computing device 155 or the service provider computing device 160) to the client computing device 150, output from the speaker 154. The computer generated voice can include recordings from a real person or computer generated language.

The content provider computing device 155 can provide audio based content items for display by the client computing device 150 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 155 can also provide audio based content items (or other content items) to the data processing system 105 where they can be stored in the data repository 145. The data processing system 105 can select the content items that include an audio component and provide (or instruct the content provider computing device 155 to provide) the content items to the client computing device 150. The audio based content items can be exclusively audio or can be combined with text, image, or video data. The content items can include one or more audio files that when rendered provide an audio output or acoustic wave. The content items can include other content (e.g., text, video, or image content) in addition to or instead of audio content. For example the content items can include text or image files, or combinations thereof, that do not include audio files and that do not render audio output.

The service provider computing device 160 can include at least one service provider natural language processor (NLP) component 161 and at least one service provider interface 162. The service provider NLP component 161 (or other components such as a direct action API of the service provider computing device 160) can engage with the client computing device 150 (via the data processing system 105 or bypassing the data processing system 105) to create a back-and-forth real-time voice or audio based conversation (e.g., a session) between the client computing device 150 and the service provider computing device 160. For example, the service provider interface 162 can receive or provide data messages to the direct action API 135 of the data processing system 105. The service provider computing device 160 and the content provider computing device 155 can be associated with the same entity. For example, the content provider computing device 155 can create, store, or make available content items for a car sharing service, and the service provider computing device 160 can establish a session with the client computing device 150 to arrange for a delivery of a taxi or car of the car share service to pick up the end user of the client computing device 150. The data processing system 105, via the direct action API 135, the NLP component 110 or other components can also establish the session with the client computing device 150, including or bypassing the service provider computing device 160, to arrange for example for a delivery of a taxi or car of the car share service.

The data repository 145 can include one or more local or distributed databases, and can include a database management system. The data repository 145 can include computer data storage or memory and can store one or more parameters 146, one or more policies 147, content data 148, or templates 149 among other data. The parameters 146, policies 147, and templates 149 can include information such as rules about a voice based session between the client computing device 150 (or the service provider computing device 160) and the data processing system 105. The content data 148 can include content items for audio output or associated metadata, as well as input audio messages that can be part of one or more communication sessions with the client computing device 150.

The data processing system 105 can include an application, script or program installed at the client computing device 150, such as an app to communicate input audio signals to the interface 115 of the data processing system 105 and to drive components of the client computing device to render output audio signals. The data processing system 105 can receive data packets or other signal that includes or identifies an audio input signal. For example, the data processing system 105 can execute or run at least part of the NLP component 110 to receive the audio input signal.

The NLP component 110 can convert the audio input signal into recognized text by comparing the input signal against a stored, representative set of audio waveforms (e.g., in the data repository 145) and choosing the closest matches. The representative waveforms are generated across a large set of users, and can be augmented with speech samples. After the audio signal is converted into recognized text, the NLP component 110 can match the text to words that are associated, for example via training across users or through manual specification, with actions that the data processing system 105 can serve.

The audio input signal can be detected by the sensor 151 (e.g., a microphone) of the client computing device. Via the transducer 152, the audio driver 153, or other components the client computing device 150 can provide the audio input signal to the data processing system 105 (e.g., via the network 165) where it can be received (e.g., by the interface 115) and provided to the NLP component 110 or stored in the data repository 145 as content data 148.

The system 100 can optimize processing of action data structures that include sequence dependent operations in a voice activated data packet (or other protocol) environment. For example, the data processing system 105 can include or be part of a voice activated assistant service, voice command device, intelligent personal assistant, knowledge navigator, event planning, or other assistant program. The data processing system 105 can provide one or more instances of audio output for display from the client computing device 150 to accomplish tasks related to this input audio signal. The tasks can include, for example, communicating with the service provider computing device 160 or other third party computing devices to make dinner reservations or purchase movie tickets. For example, an end user can enter an input audio signal into the client computing device 150 of: "OK, I would like to go to go dinner tonight." This input audio signal can be detected by the sensor 151 (e.g., a microphone) of the client computing device 150 and transformed (e.g., by the transducer 152) into a data packet or other protocol based structure for transmission to the data processing system 105.

The NLP component 110 can receive or otherwise obtain at least one first input audio signal. For example, via the interface 115 and the computer network 165 the NLP component 110 can obtain the first input audio signal from the client computing device 150. The NLP component 110 can extract data from or otherwise parse the first input audio signal to identify at least one first request or at least one first trigger keyword corresponding to the first request. The first request can indicate intent or subject matter of the first input audio signal, e.g., an intent to eat dinner. The first trigger keyword can indicate a type of action likely to be taken. For example, the NLP component 110 can parse the first input audio signal to identify at least one request to leave home for the evening for dinner. The first trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary or sub-action to at least one other action that is indicated by the request.

The NLP component 110 can receive a second input audio signal. For example, the first audio input signal can be "OK, I would like to go to go dinner tonight" and the second audio input signal can be "OK, I would like to catch a movie later". The NLP component 110 can receive or otherwise obtain the second input audio signal from any client computing device 150, in an analogous manner to which the first input audio signal was obtained, e.g., via the network 165. The NLP component 110 can extract data from or otherwise parse the second input audio signal to identify at least one second request or at least one second trigger keyword corresponding to the second request. The second request can indicate intent or subject matter of the second input audio signal, e.g., an intent to watch a movie in a theater. The second trigger keyword can indicate a type of action likely to be taken. For example, the NLP component 110 can parse the second input audio signal to identify at least one request to leave home for the evening to watch a movie. The second trigger keyword can include at least one word, phrase, root or partial word, or derivative indicating an action to be taken. For example, the trigger keyword "to catch" from the second input audio signal can indicate a need for transport, e.g., as an ancillary or sub-action to at least one other action that is indicated by the request.

The direct action API 135 can execute programs or scripts, for example from the NLP component 110, the thread optimization component 120, or the content selector component 125 to perform tasks or actions, or to identify content items responsive to input audio signals. The direct action API 135 can execute a specified action to satisfy the end user's intention, as determined by the data processing system 105. Depending on the action specified in its inputs, the direct action API 135 can execute code or a dialog script that identifies the parameters required to fulfill a user request. Such code can lookup additional information, e.g., in the data repository 145, such as the name of a home automation service, or it can provide audio output for rendering at the client computing device 150 to ask the end user questions such as the intended destination of a requested taxi, genre of a movie to watch, or type of restaurant to go to for dinner. The direct action API 135 can determine necessary parameters and can package the information into an action data structure, which can then be sent to another component such as the content selector component 125 or to the service provider computing device 160 (or content provider computing device 155) to be fulfilled.

The direct action API 135 of the data processing system 105 can generate, based on the request or the trigger keyword, data structures for the actions of the thread. The action data structures can be generated responsive to the request. The action data structure can be included in the messages that are transmitted to or received by the service provider computing device 160. Based on the request parsed by the NLP component 110, the direct action API 135 can determine to which of a plurality of service provider computing devices 160 the message should be sent.

The direct action API 135 can generate a first action data structure based on the first trigger keyword and in response to the first request, and can generate a second action data structure based on the second trigger keyword and in response to the second request. For example, if the first input audio signal includes "go to dinner tonight" the NLP component 110 can identify the trigger word "tonight" and the request for a dinner suggestion or reservation. The direct action API 135 can package the request into a first action data structure for transmission as a message to a service provider computing device 160 (or content provider computing device 155) of a restaurant. The first input audio signal can include other requests or trigger keywords that indicate other actions, ancillary to the dinner action. These actions can be included in the first action data structure. For example, the NLP component 110 can identify first requests or first trigger keywords for transportation to or from dinner (additional actions) from the first input audio signal of "OK, I would like to go to go dinner tonight".

If, for example the second input audio signal includes "catch a movie later" the NLP component 110 can identify the request to see a movie with the trigger keywords "catch" or "later". The direct action API 135 can package the request into a second action data structure for transmission as a message to a service provider computing device 160 (or content provider computing device 155) of a movie company or movie theater. The second input audio signal can include other second requests or second trigger keywords that indicate other actions, ancillary to the movie action. These actions can be included in the second action data structure. For example, the NLP component 110 can identify first requests or first trigger keywords for transportation to or from a movie theater (additional actions) from the second input audio signal of "OK, I would like to catch a movie later".

The first and second, or any other action data structures can also be passed to the content selector component 125. The action data structures can include information for completing one or more actions associated with the request. In this example, the information can include restaurant or movie interest indicators, location information, an identification or location of a restaurant or type of restaurant, restaurant reservation information, movie show times at a theater, theater location information, or a pick up location and a destination location. The direct action API 135 can retrieve a template 149 from the repository 145 to determine which fields to include in the action data structure. The direct action API 135 can retrieve content from the repository 145 to obtain information for the fields of the data structure. The direct action API 135 can populate the fields from the template with that information to generate the data structure. The direct action API 135 can also populate the fields with data from the input audio signal or third party sources. The templates 149 can be standardized for categories of service providers or can be standardized for specific service providers. For example, ride sharing service providers can use the following standardized template 149 to create the data structure: {client_device_identifier; authentication_credentials; pick_up_location; destination_location; no_passengers; service_level}. The data structure can include variable fields. The variable fields can indicate, for example, a sequence or order of operation of multiple actions identified indicated by or related to at least one action of a data structure. The direct action API 135 can populate fields of the data structure, including variable fields. The direct action API 135 can populate or enter data into one or more variable fields of a data structure based on a sequence dependency between actions, such as a second action that begins after a first action ends.

The direct action API 135 can construct data transmissions that include data packets corresponding to action data structures. For example, the data transmissions can include packetized versions of the action data structures, e.g., data packets with header and payload regions that indicate information represented by the data structures. The data transmissions can be used to establish (e.g., take part in) at least one communication session between the service provider computing device 160 and the client computing device 150 via the data processing system 105. The session handler component 140 can establish or identify the communication sessions via the interface 115. For example, subsequent to merging or associating action first and second data structures (or their corresponding packetized data transmissions) into a single thread, the data processing system 105 can provide the data transmissions to the service provider computing device 160. As part of the communications of the communication session, the service provider computing device 160 can also receive, via the data processing system 105, data packets (or other data messages) from the client computing device 105. For example, the data processing system 105 can receive and can route inbound data messages from the client computing device 150 to the service provider computing device 160 as part of the communication session.

The thread optimization component 120 can obtain or access data packets of the first and second (and any other) data transmissions. For example, the direct action API 135 can provide the transmissions (e.g., the corresponding data packets) to the data repository 145 for storage, where they can be retrieved by the thread optimization component 120. The thread optimization component 120 can also receive the data packets (or other protocol based structure) of the data transmissions from the direct action API 135 (or other data processing system 105 component) bypassing the data repository 145.

The thread optimization component 120 can parse or otherwise extract information from data packets of multiple data transmissions that correspond respectively to multiple action data structures. For example, the thread optimization component 120 can apply a heuristic technique to data packets of a first data transmission (or to the corresponding first data structure) and to data packets of a second data transmission (or to the corresponding second data structure)

to determine at least one sequence dependency parameter. The heuristic or other statistical technique can determine or identify with a threshold degree of certainty patterns among the first and second data transmissions (or corresponding data structures) that indicate a sequence dependency of actions indicated by the data transmissions.

The sequence dependency parameter can indicate the existence or likelihood (e.g., relative to a threshold level or other benchmark) of actions represented by the data transmissions (or corresponding action data structures) having an order of operations, time, or sequence dependency on each other. The sequence dependent operations or actions, indicated by the sequence dependency parameters, can include a number of actions that occur in a known, suggested, required, or particular order. For example, going from home to a movie theater, then back home can include three sequence dependent operations or actions. The first action in this example includes travelling from home to the movie theater. The second action includes watching the movie in the theater. The third action includes returning home from the theater.

These three (and perhaps other) actions can be determined by the direct action API 135 from requests or trigger keywords corresponding to the input audio signal "OK, I would like to catch a movie later". In this example, the second action in the sequence (watching the movie) is subsequent to and dependent on the first action (going out from home to the movie theater), and the third action (returning home) is subsequent to and dependent on the first action and the second action. The third action can be considered subsequent to and dependent on the second action, as having expressed an intent to do so, the data processing system 105 determines or predicts that the end user would watch the movie in the theater before returning home as well.

Based on the sequence dependency parameter, the thread optimization component 120 can merge two or more packetized data transmissions (or their corresponding action data structures) into a single thread. The single thread can include data identifying actions as well as other data (e.g., metadata or third party data) from multiple data action structures. The single thread can be in packetized (or other protocol based) form, e.g., in the same format as the first and second data transmissions. The single thread can also be in a data structure format, e.g., generated by the direct action API 135, or following a format of at least one template 149, policy 147, or parameter 146. The single thread can include or indicate an association or linking of actions from one or more data transmissions, or from one or more action data structures.

The data transmissions or action data structures can be merged or otherwise associated with one another by the thread optimization component 120 to generate the single thread prior to transmission of the data indicated by the action data structures via the communication session to the service provider computing device 160. In this example, the direct action API 135 or other data processing system 105 component (e.g., the interface 115) can transmit at least part of the data indicated by the single thread, subsequent to the merger or creation of the single thread, to the service provider computing device 160 for the first time. For example, prior to creation of the single thread, the data processing system 105 may have delayed, prevented withheld, or not transmitted data associated with the first or second (or any other) data structure. In some examples, at least some of the data indicated by individual data structures can be provided by and from the data processing system 105 to the service provider computing device 160 prior to creation of the single thread.

The thread optimization component 120 can merge or otherwise consolidate or associate the data transmissions (or corresponding action data structures) into the single thread based on the sequence dependency parameter. For example, the first data transmission (and first data structure) can represent actions associated with the first input audio signal "OK, I would like to go to go dinner tonight" the second data transmission (and second data structure) can represent actions associated with the second input audio signal "OK, I would like to catch a movie later". The first and second (or any other) input audio signals can be sequential (following on another by less than one minute), separated from one another by time (e.g., greater than one minute), and can originate from the same or different client computing devices 150. The thread optimization component 120 can obtain data packets (or other data) representing this information, and can determine at least one sequence dependency parameter. For example, the sequence dependency parameter can indicate that the action of returning home from the movie theater occurs after the action of watching the movie, or that the action of watching the movie occurs or is predicted to occur after the action of eating dinner.

The single thread (in any data structure or format) can indicate a set of sequence dependent operations that correspond to one or more input audio signals (or corresponding data structures or data transmissions), such as a series of actions. The thread can include any two or more actions, such as a first action, a second action, and a third action. For example, a merger of the first input audio signal "OK, I would like to go to go dinner tonight," and the second input audio signal "OK, I would like to catch a movie later" can include at least one request indicating an interest to attend dinner and a movie, and at least one trigger keyword, e.g., "go" indicating a need for transportation. The thread optimization component 120 can identify at least one sequence dependency parameter indicating at least one sequence, temporal, or order of operations dependency between the actions and can generate the single thread to combine the multiple input audio signals (or corresponding template based data structures or packet/protocol based data transmissions). The thread optimization component 120 can create the single thread that indicates at least three actions, such as a dinner action (first action), a movie action (second action), and a transportation home action (third action). In this example, from the requests or the trigger keywords the thread optimization component 120 generates a single thread from multiple separate inputs that indicates the three actions. The single thread can include other actions, such as an initial transport to dinner action.

The data processing system 105 or component thereof such as the thread optimization component 120 can determine that the actions of the thread are sequence dependent operations. For example, the thread optimization component can determine that the second action of watching the movie is subsequent to the first action of eating dinner, and that the third action of travelling home from the movie theater is after the second action of watching the movie. The thread optimization component 120 can access the parameters 146 or policies 147 in the data repository 145 to determine or otherwise estimate the order of the sequence dependent actions. For example, the parameters 146 or policies 147 could indicate that a transport action (e.g., a taxi home) can occur after an event action (e.g., watching a movie).

The content selector component 125 can obtain indications of any of the actions of the single thread. For example, the thread optimization component 120 can directly or indirectly (e.g., via the data repository 145) provide at least a portion of the single thread that indicates the third (or any other) action to the content selector component 125. The content selector component 125 can obtain this information from the data repository 145, where it can be stored as part of the content data 148. The indication of the third action can inform the content selector component 125 of a need for transportation from the location of the movie theater to a location as determined or indicated by the client computing device 150, such as a ride to an end destination.

The content selector component 125 can obtain indications of a later action in the thread prior to the occurrence of at least one earlier action. For example, the content selector component 125 can receive an indication of the third action (e.g., a need for a ride from the movie theater) before the movie plays in the theater (second action), or before the person who input the input audio signal into the client computing device 150 eats dinner at the restaurant (first action). The content selector component 125 can obtain indications of at least one action of the thread before completion of at least one action of the thread.

From the information received by the content selector component 125, e.g., an indication of the third action before occurrence of at least one prior action in the sequence dependent thread, the content selector component 125 can identify at least one content item. The content item can be responsive or related to the third (or any other) action. For example, the content item can include an audio message offering services of a car share company, responsive to the third action that indicates a transportation need. The content selector component 125 can query the data repository 145 to select or otherwise identify the content item, e.g., from the content data 148. The content selector component 125 can also select the content item from the content provider computing device 155. For example responsive to a query received from the data processing system 105, the content provider computing device 155 can provide a content item to the data processing system 105 (or component thereof) for eventual output by the client computing device 150.

The audio signal generator component 130 can generate or otherwise obtain an output signal that includes the content item responsive to the third (or any other) action. For example, the data processing system 105 can execute the audio signal generator component to generate or create an output signal corresponding to the content item. The interface 115 of the data processing system 105 can provide or transmit one or more data packets that include the output signal via the computer network 165 to the client computing device 150, e.g., as part of the communication session. The interface 115 can be designed, configured, constructed, or operational to receive and transmit information using, for example, data packets. The interface 115 can receive and transmit information using one or more protocols, such as a network protocol. The interface 115 can include a hardware interface, software interface, wired interface, or wireless interface. The interface 115 can facilitate translating or formatting data from one format to another format. For example, the interface 115 can include an application programming interface that includes definitions for communicating between various components, such as software components of the system 100.

For example the data processing system 105 can provide the output signal from the data repository 145 or from the audio signal generator component 130 to the client computing device 150. The data processing system 105 can also instruct, via data packet transmissions, the content provider computing device 155 or the service provider computing device 160 to provide the output signal to the client computing device 150. The output signal can be obtained, generated, transformed to or transmitted as one or more data packets (or other communications protocol) from the data processing system 105 (or other computing device) to the client computing device 150.

The content selector component 125 can skip to a later action in a set of sequence dependent operations indicated by the single thread to select a content item for the later action prior to occurrence (and prior to an immediate need) for activity corresponding to the later action. By skipping to a later sequenced action, e.g., to select a content item for the second subsequent action prior to selecting a content item for a first prior action, the data processing system 105 is not required to first process information related to the prior action to select content items for subsequent actions. This reduces processor utilization, power consumption and bandwidth from data transmissions that would otherwise be associated with selecting a content item (for the first action) prior to selecting the content item for the second action.

The content selector component 125 can select the content item for the (subsequent or later) action as part of a real-time content selection process. For example, the content item can be provided to the client computing device for transmission as audio output in a conversational manner in direct response to the input audio signal. The real-time content selection process to identify the content item and provide the content item to the client computing device 150 can occur within one minute or less from the time of the input audio signal and be considered real-time.

The output signal that corresponds to the content item corresponding to the content provider computing device 155 (or data corresponding to the service provider computing device 160), for example obtained or generated by the audio signal generator component 130 transmitted via the interface 115 and the computer network 165 to the client computing device 150, can cause the client computing device 150 to execute the audio driver 153 to drive the speaker 154 to generate an acoustic wave corresponding to the output signal. The acoustic wave can include words of or corresponding to the content item or other data for the later, (e.g., second or third) action. The output signal that corresponds to the content item can also include non-audio content items that render on the client computing device 150 that is the source of the input audio signal or on a different client computing device 150 (e.g., a wearable device computing device) as text or image messages that can render without audio elements.

The data processing system 105 can provide the output signal that includes the content item or other data responsive to an action in direct or real-time response to the input audio signal so that the packet based data transmissions via the computer network 165 that are part of a communication session between the data processing system 105 and the client computing device 150 has the flow and feel of a real-time person to person conversation. This packet based data transmission communication session can also include the content provider computing device 155 or the service provider computing device 160.

The content selector component 125 can select content items provided in response to the second (or any non-first) action in the sequence dependent set of actions before selecting any content item for any prior action in the sequence. This avoids the need to process at least some of the data corresponding to the prior actions, which causes the second content item to be selected with a reduced number of processing operations than would occur if the content items were selected in an order that matches the order of the sequence of actions. Content items for the prior (e.g., first and second) actions may or may not be selected, for example after selection of the content item for the second action.

The content selector component 125 can select the content item (e.g., for the second action) based on at least one trigger keyword of the thread that indicates subject matter different than subject matter of the one or more requests of the same thread. For example, the requests of the single thread can indicate subject matter of a dinner request (first action), and subject matter of a movie request (second action). This subject matter does not indicate any transportation request. However, the NLP component 110 or the thread optimization component 120 (or other data processing system 105 components executing as part of the direct action API 135) can identify the trigger keyword "go" "go to" or "to go to" and can determine a transportation request based at least in part on the trigger keyword. Thus, the data processing system 105 can infer actions from the input audio signal that are secondary requests that are not the primary request or subject of the input audio signal.

The data processing system 105 can prevent or delay transmission of the output signal that includes the content item. For example, the interface 115 or a script executing via the direct action API 135 can prevent transmission of data packets that include the output signal corresponding to a content item or to an action of the single thread until a triggering event. The triggering event can include expiration of a pre-determined time period, such as two hours or a time coinciding with occurrence of an earlier action in the thread, such as a scheduled end time of a movie. The triggering event can also include an authorization indication received by the data processing system 105 from the client computing device 150. The authorization indication can originate as a subsequent audio input associated with the thread but received by the data processing system 105 subsequent to the input audio signal, a text-based or other non-audible signal, or can include an indication of a setting of the client computing device 150 that authorizes receipt by the client computing device 150 of content items.

The data processing system 105 can also delay transmission of the content item associated with a second or subsequent to second action of the thread to optimize processing utilization. For example, the data processing system 105 can delay content item transmission until an off-peak or non-peak period of data center usage, which results in more efficient utilization of the data center by reducing peak bandwidth usage, heat output or cooling requirements. The data processing system 105 can also initiate a conversion or other activity associated with the content item, such as ordering a car service, based on data center utilization rates or bandwidth metrics or requirements of the network 165 or of a data center that includes the data processing system 105.

The content items can correspond to the actions of the thread, and the content selector component 125 can select a content item for one, more than one, or all actions of the thread. The thread optimization component 120 can identify the sequence dependent thread of actions of, for example, "dinner" (first action) "movie" (second action) and "transport from movie location" (third action).

For example, based on the single thread, the content item for the third action can be provided for rendering at the client computing device 150 as an audio response that states "Would you like a ride home from the movie theater?" in response to the audio input signal. Subsequent or prior to this rendering, the data processing system 105 can select or provide a content item, e.g., "the Italian restaurant downtown has an opening for 7 pm tonight—are you interested?" for the first action (dinner), and can select or provide another content item, e.g., "would you like tickets to the 9 pm movie at the downtown theater?" for the second action (movie). The data processing system 105 can provide (which includes instructing the content provider computing device 155 to provide) these content items responsive to the input audio signal for rendering by the client computing device 150 as audio output content items. The data processing system 105, via the interface 115, can select or provide these content items in any order to the client computing device 150. For example, the content item for the third (e.g., last) action can be selected or provided first, before content items corresponding to other, earlier actions of the thread.

The data processing system 105 can receive a response to the content item "would you like a ride home from the movie theater?" The response can include an input audio signal, e.g., "yes please" that was entered into the client computing device 150 by the end user and received by the data processing system 105. The data processing system 105 or component thereof (e.g., the thread optimization component) can include the response as part of the single thread. Based on this response, the direct action API 135 can communicate with the service provider computing device 160 (that can be associated with the content item, such as a car share company) to order a taxi or ride share vehicle for the location of the movie theater at the time the movie ends. The data processing system 105 can obtain this location or time information as part of the data packet (or other protocol) based data message communication with the client computing device 150, from the data repository 145, or from other sources such as the service provider computing device 160 or the content provider computing device 155. Confirmation of this order (or other conversion) can be provided as an audio communication from the data processing system 105 to the client computing device 150 in the form of an output signal from the data processing system 105 that drives the client computing device 150 to render audio output such as, "great, you will have a car waiting for you at 11 pm outside the theater." The data processing system 105, via the direct action API 135, can communicate with the service provider computing device 160 to confirm the order for the car.

The data processing system 105 can obtain the response (e.g., "yes please") to the content item ("would you like a ride home from the movie theater?") and can route a packet based data message to the service provider NPL component 161 (or other component of the service provider computing device). This packet based data message can cause the service provider computing device 160 to effect a conversion, e.g., to make a car pick up reservation outside the movie theater. This conversion—or confirmed order—(or any other conversion of any other action of the thread) can occur prior to completion of one or more actions of the thread, such as prior to completion of the movie, as well as subsequent to completion of one or more actions of the thread, such as subsequent to dinner.

Based on a response to a content item for a subsequent action in the thread, such as the response "yes please" to the content item "would you like a ride home from the movie theater" for the third and last action in a sequence dependent thread, the data processing system 105 can initiate a conversion or action. This can occur before the end user has begun any activities associated with the thread, e.g., before dinner or before the movie is over. Processors of the data processing system 105 can invoke the direct action API 135 to execute scripts that order a car from a car share service. The direct action API 135 can obtain content data 148 (or parameters 146 or policies 147) from the data repository 145, as well as data received with end user consent from the client computing device 150 to determine location, time, user accounts, logistical or other information in order to reserve a car from the car share service. Using the direct action API 135, the data processing system 105 can also communicate with the service provider computing device 160 to complete the conversion by in this example making the car share pick up reservation.

The direct action API 135 can initiate the conversion or activity to accomplish an action of the thread at any time during a time period from receipt by the data processing system 105 of the first input audio signal associated with the thread, (e.g., "OK, I would like to go to go dinner and then a movie tonight") until a threshold time period subsequent to completion of one of the actions of the thread, (e.g., until 15 minutes after the end of the second action of watching the movie). The data processing system 110 can also determine the end of this time period based on other factors, such as an indication that the end user has completed the actions of the thread, e.g., has returned home or is no longer located at the movie theater. The data processing system 105 can also obtain an indication from the client computing device 150 (a data message transmitted via the network 165) that the thread is cancelled or dormant or that the end user has cancelled or completed actions of the thread.

The direct action API 135 can initiate the conversion or activity to accomplish an action of the thread based on completion or time of completion of other actions of the thread. For example, the data processing system 105 can order a good or service (car share pick-up) directly or by communicating with the service provider computing device 160 within a threshold time period of a conclusion of a prior action in the thread. Within 5 minutes (or other time period) prior or subsequent to the scheduled or actual conclusion of the movie (second action), the data processing system 105 can confirm or order a car share service to send a car to pick up the end user at the movie theater (subsequent, third action). This can occur in the absence of input received from the end user computing device 150 during this time period, or responsive to a prompt received from the end user computing device 150 during this time period.

The direct action API 135 can initiate the conversions or other activity associated with the sequence dependent operations of the thread in any order. For example, the direct action API 135 (or other data processing system 105 component) can initiate activity corresponding to a final action (e.g., the third action in a three action thread such as ordering a taxi) prior to initiating activity corresponding to an earlier thread in the sequence, (e.g., prior to making a dinner reservation or prior to ordering movie tickets). In this example the data processing system 105 initiates activity for an earlier (e.g., second) action subsequent to initiation of activity for the later (e.g., third) action.

The content selector component 125 can identify, select, or obtain multiple content items resulting from a multiple content selection processes. The content selection processes can be real-time, e.g., part of the same conversation, communication session, or series of communications sessions between the data processing system 105 and the client computing device 150 that involve a thread. The conversation can include asynchronous communications separated from one another by a period of hours or days, for example.

The conversation or communication session can last for a time period from receipt of the first input audio signal until an estimated or known conclusion of a final action of the thread, receipt by the data processing system 105 of an indication of a termination of the thread. This can be referred to as the active time period of the thread. For example, for a thread with three actions (e.g., dinner, move, and transport home), the content selector component 125 can select at least one content item for each action. The content item selector component 125 can run or obtain results from a different content selection process for each action. In the content selection processes the content provider computing device 150 can set forth content items for selection by the content selector component 125. For a thread with at least three actions, the content item selector component can select or otherwise identify a first content item for the first action via a first content selection process, a second content item for the second action via a second content selection process, and a third content item for the third action via a third content selection process. The data processing system 105 that provides these content items for rendering by the client computing device 150 during the active time period of the thread can be considered to be operating in real-time. In this example the content selection processes and rendering of the content items occurs in real time.

The data processing system 105 can cancel actions associated with content items. For example, after ordering the car service the end user may watch the movie but then decide to walk home, or to have desert after the movie instead of taking a car home. An app or other program executing at the client computing device 150 as part of the data processing system 105 can receive an input audio signal of "cancel my ride home". The NLP component 110 can receive this input audio signal, for example as one or more packet based data messages, and can determine that this input audio signal relates to a pre-existing thread (e.g., dinner, movie, transport home) and is part of the same conversation or communication. For example, the NLP component 110 (or other data processing system 105 component) can evaluate time data, location data and pre-existing thread data such as past, present, or scheduled actions of a thread from the content data 148 of the data repository 145 to determine that an input audio signal relates to a pre-existing thread. Based, for example, on the request "ride" or the trigger keyword "cancel" the NLP component 110 can determine that the input audio signal "cancel my ride home" relates to the content item "would you like a ride home from the movie theater?" that corresponds to the third action of a pre-existing thread. The direct action API 135 (or other component) can cause the data processing system 105 to communicate via the interface 115 with the service provider computing device 160 to cancel the order for the taxi or car share service to have a car waiting for the end user outside the movie theater upon conclusion of the movie.

The NLP component 135 can receive the data packet or other protocol based message to cancel an action of the thread prior to or subsequent to completion of any action of the thread. The NLP component 135 can receive from the client computing device 150 (or obtain from the data repository 145) a data message (inbound audio signal) to cancel an action of the thread within a time interval triggered by an earlier action of the thread. For example, in a sequence dependent thread with three actions, dinner, movie, transport, the data processing system 105 can receive the transport cancellation data message within 5 minutes (or other time period) of the conclusion of the movie. The data processing system 105 can prompt for confirmation of a product or service related to an action of the thread. For example, during a time period between the first action and the second action (e.g., after dinner and before the movie) the data processing system 105 can transmit a data message to the client computing device 150 that, when rendered at the client computing device 150 outputs the audio or text message stating "just confirming that you still want a car waiting for you after the movie." The data processing system 105 can receive a response, e.g., "yes, confirmed" or "no, cancel the car". This response can be included as part of the thread. The direct action API 135 can execute scripts to process this information and can communicate with the service provider computing device 160 to indicate the confirmation or the cancellation.

Figure 2:
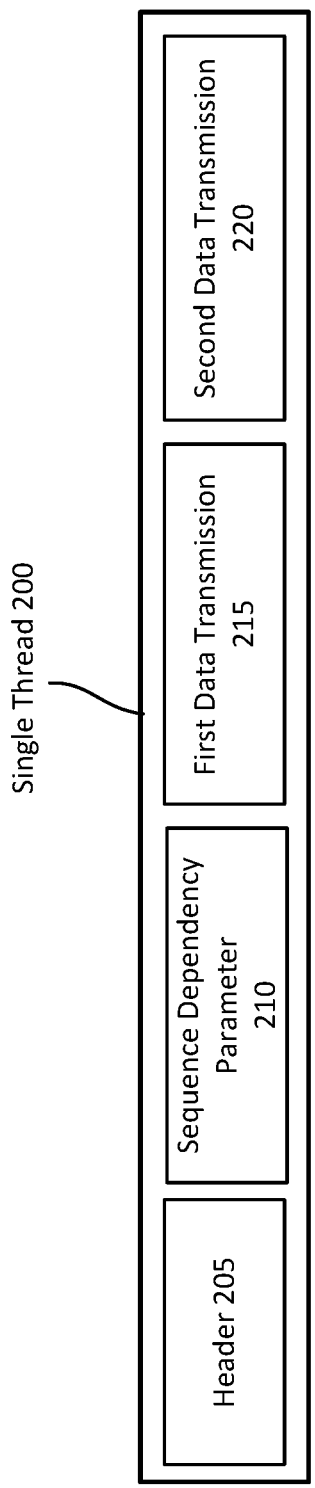
FIG. 2 depicts a functional diagram of a single thread structure for a voice activated data packet based computer network environment.

Referring to FIG. 1 and FIG. 2, among others, based on the sequence dependency parameter, the thread optimization component 120 can create at least one single thread data structure 200. The single thread data structure 200 can include a packet based architecture (or other format) and can include at least one header 205. The header 205 can include supplemental data identifying the data processing system 105, source or destination address information, governing protocol information, IP addresses, frame synchronization data, size data, resolution data, or metadata associated with action data structures. The payload or body of the single thread data structure 200 can include at least one sequence dependency parameter 210, or other information such as at least one first data transmission 215 or at least one second data transmission 220. The single thread data structure 200 can include one or more than one structures, e.g., multiple packets having respective headers 205 and payloads indicating at least part of the first data transmission 215 or the second data transmission 220. The sequence dependency parameter 215 can indicate a sequence dependency of actions from the plurality of actions indicated by the first data transmission 215 or the second data transmission 220.

The header 205, sequence dependency parameter 210, first data transmission 215, and the second data transmission 220 may but need not be included in the single thread data structure 200. For example, the body of the single thread data structure 200 can include only the first data transmission 215 (or portion thereof) and not include any of the sequence dependency parameter 210 or the second data transmission 220, or the body of the single thread data structure 200 can include the sequence dependency parameter 210 as well as one or more of the first data transmission 215 and the second data transmission 220. The single thread data structure 200 can include one or more individual packets transmitted separately in sequence or parallel as part of one or more data transmissions between the data processing system 105 and the service provider computing device 160 or the content provider computing device 155. The header 205 or the sequence dependency parameter 210 can indicate that the separate transmissions or separate data packets are associated with the same batch transmission, e.g., the same overall single thread data structure 200. The direct action API 135 can merge or otherwise link together multiple different single thread data structures into one single thread data structure 200. The single thread data structure 200 can include multiple packets or multiple different structures that are separate but associated with one another.

The thread optimization component 120 can prioritize one action of the single thread data structure 200 over another action. The prioritization can be indicated by the sequence dependency parameter 210 or otherwise provided to the direct action API 135 or the content selector component 125.

For example, the thread optimization component 120 can prioritize a first in time action indicated by the single thread data structure 200. Responsive to the prioritization, the direct action API 135 or other component such as the content selector component 125 can provide data transmissions (e.g., at least part of the first data transmission 215 or the second data transmission 220) to the content provider computing device 155 or to the service provider computing device 160 to effect a conversion related to the first in time action.

Figure 3:
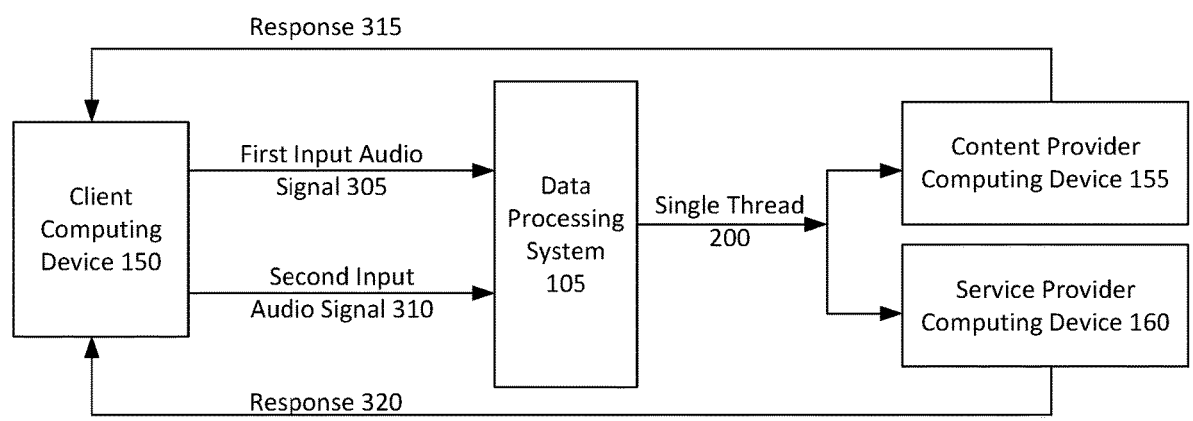
FIG. 3 depicts a functional diagram of thread data structure generation and communication between remote data processing systems and service provider computing devices in a voice activated data packet based computer network environment.

Referring to FIG. 3, among others, the data processing system 105 can receive, from a first client computing device 150, the first input audio signal 305, (e.g., "OK, I would like to go to go dinner tonight"). The data processing system 105 can also receive, from the same or a different client computing device 150, the second input audio signal 310, (e.g., "OK, I would like to catch a movie later"). The data processing system 105 can generate respective action data structures and corresponding data transmissions for the first and second audio input signals 305, 310. Data processing system 105 components such as the thread optimization component 120 can apply statistical or heuristic techniques to the first input audio signal 305 and the second input audio signal 310 to generate at least one sequence dependency parameter indicative of sequence dependent actions from among the actions of the first input audio signal 305 and the second input audio signal 310. The data processing system 105 can batch or pool the data transmission (e.g., packets) or the action data structures corresponding to the first input audio signal 305 and the second input audio signal 310 to create the batched or pooled single thread data structure 200. The data processing system 105 can transmit or otherwise provide the single thread data structure 200 to the service provider computing device 160 for processing by the service provider computing device 160 to, for example reserve at least one car, purchase movie tickets, or make a dinner reservation responsive to the first and second input audio signals 305, 310.

Different instances of portions of the same single thread data structure can be provided to different computing devices. For example, all or some of the single thread 200 can be provided to a service provider computing device 160 to effect a conversion, e.g., order a car from a car share service, and the same or different portions of the single thread 200 can be provided (simultaneously is sequentially) to a content provider computing device 155 to effect another conversion, e.g., obtain a content item for a restaurant.

Responsive to receipt of the single thread data structure 200, the content provider computing device 155 or the service provider computing device 160 can perform at least one operation defined or indicated by the single thread data structure 200. The operation can correspond to one or more of the respective actions of the action data structures (or data transmissions) of the first or second input audio signals 305, 310. For example, the operations can include reserving a car from a car share service, from the service provider computing device 160, or providing a content item for a movie. For example, the content provider computing device 155 can provide a first response 315 (e.g., a content item for a movie) to the client computing device 150, and the service provider computing device 160 can provide a second response 320 (e.g., to reserve a car) to the same or a different client computing device 150. The first and second responses 315, 320, can bypass the data processing system 105 during transmission from the content provider computing device 155 or the service provider computing device 160 to the client computing device 150. The responses 315, 320, can include text, image, or other data messages (including audio) that confirm a conversion action, such as a reservation for a car from a car service or rending of a content item. The data processing system 105 can receive an indication of the conversion (or of the responses 315, 320) via the computer network 165 from the service provider computing device 160, the content provider computing device 155, or from the client computing device 150.

The single thread 200 created by the data processing system 105 (e.g., by the thread optimization component 120 or the direct action API 135) can indicate an actual, known, scheduled, or estimated time of actions that correspond to the thread. These times can include movie start times, transport pick up times, dinner reservation times, or event times, among others. The times can be discrete times, e.g., 8:00 pm dinner reservations, or relative times relative to other actions, e.g., the action 'B' is scheduled to begin 15 minutes after the known or estimated conclusion time of action 'A'. For example, the thread 200 can indicate that a first action (e.g., eating dinner) is scheduled to occur prior to a second action (e.g. watching a movie). These actions can correspond to data structure (or data transmission) actions identified from input audio signals. The direct action API 135 can detect the completion of a first action. For example, the computing device 150 can execute a script to pay the bill at the restaurant, or the direct action API 135 can estimate that dinner will last for 90 minutes, or the end user can provide an audio input signal or other data message to indicate that the first action is complete or scheduled for completion at a time or within a time window. Responsive to detection of completion (e.g., a known or estimate end time) of a first action, the direct action API 135 can proceed to transmit data packets of the single thread to a service provider computing device 160 or to a content provider computing device 155. This transmission can occur subsequent to known or estimated completion of the first action, or during a time window, (e.g., within one hour) of known or estimated completion of the first action. For example, upon completion of dinner, the direct action API 135 can provide at least part of the single thread 200 to a service provider computing device 160 to purchase movie tickets, or to a content provider computing device 155 to obtain a content item for a movie. Indications of the conversions (e.g., purchase of the tickets or rendering of the content item at the client computing device 150) can be provided to the data processing system 105 from the client computing device 150, the content provider computing device 155, or the service provider computing device 160. The sequence dependency parameter 210 can indicate the order in which actions of the single thread 200 are scheduled to occur, e.g., can indicate that a first action is scheduled to occur prior to a second action.

The direct action API 135 can identify at least one deadlock condition of at least one action of the single thread 200. A deadlock condition can indicate that a second action cannot proceed until after a first, prior action is complete. For example, the direct action API 135 can identify a deadlock condition when the first action is a movie action (watching a movie in a theater) and a second action is transport home via a car share service after the movie is over. The direct action API 135 can determine a deadlock condition for the second action (e.g., the ride home) that lasts until a time associated with the first action, such as a scheduled end time of the movie. The direct action API 135 or other component such as the interface 115 can prevent transmission of the data transmission to a service provider computing device (e.g., a car share service) responsive to the deadlock condition. For example, the data processing system 105 or component thereof can prevent transmission of data packets of the data transmission (or data structure) for the action (e.g., to reserve a car) to a service provider computing device 160 (e.g., of a car share service) during the time period of the deadlock condition. This prevents the service provider computing device 160 from receiving the request for a car (or other service) too early.

The direct action API 135 can obtain an indication or otherwise determine that the deadlock condition has terminated or no longer exists. For example, the direct action API 135 can query the service provider computing device 160 or other third party computing device to determine a scheduled end time of a movie or other action. Upon arrival of this time, or within a threshold time period (e.g., 30 minutes or 5 minutes) in advance of this time the direct action API can break, release, or terminate the deadlock condition. Subsequent to expiration of the deadlock condition the data processing system 105 can transmit (e.g., via the interface 105) to the service provider computing device 160 data of the data transmission or data structure corresponding to a subsequent action such as a ride home after the movie.

The direct action API 135 can receive an indication form the client computing device 150 to terminate the deadlock condition. For example, the end user may decide to leave the movie early, before the movie is finished, and can enter an input audio signal into the client computing device, e.g., "OK, this movie stinks, I'd like a ride home please". The data processing system 105 (e.g., the NLP component 110 or the direct action API 135) can determine from this input audio signal that the deadlock condition has expired, and can transmit data for the subsequent action to the service provider computing device 160. Subsequent to release of the deadlock condition the direct action API 135 can also provide data for an action (e.g., data of a data transmission or action data structure of the single thread 200) to the content provider computing device 155 to obtain a content item related to the post-deadlock action. The content item can be provided by the data processing system 105 or by the content provider computing device 155 to the client computing device 150 for rendering. The content item can indicate, for example, "Sorry to hear about the movie, would you like to order a car from a car share company?". The content selector component 125 (or other component such as the interface 115 or the direct action API 135) can block selection of the content item, or transmission of the selected content item to the client computing device 150, responsive to a deadlock condition or until release of the deadlock condition.

The direct action API 135 can modify sequential orders of actions indicated by the single thread 200. For example, the direct action API can determine an indication of a first sequential order, e.g., a first action, a second action subsequent to the first action, and a third action subsequent to the second action (dinner, then a movie, then a ride home). The direct action API 135 and other components such as the NLP component 110 and the interface 115 can receive a request to modify the sequential order. For example, the data processing system 105 can receive in input audio signal from the client computing device of "OK I'd like to eat dinner after the movie." The direct action API 135 (or NLP component 110) can obtain from this audio input signal a request to modify the sequential order of the actions to, for example, a movie, then dinner, then a ride home. From this information, the direct action API 135 can generate a modified sequential order so that the second action (watching the movie) is now scheduled to occur prior to the first action (eating dinner). The direct action API 135 or content selector component 125 (or other components) can proceed accordingly to transmit data transmission of the movie action prior to data transmissions of the dinner action to the content provider computing device 155 or the service provider computing device 160. The direct action API 135 can also identify or modify a deadlock condition to delay operations related to the dinner action based on an end time of the first movie action. The actions of dinner, movies, and transport are examples and any number of end user activities or requests can constitute actions. The modifications can occur responsive to inputs other than the input audio signal. For example, if tickets to the 9 pm movie (after dinner) are sold out, the data processing system 105 can provide an audio output for rendering at the client computing device 150 to suggest watching a movie (e.g., the 5 pm showing) prior to dinner.

The data processing system 105 can perform offline action. This can save processing and electrical power requirements and reduce or shift network traffic to off-peak times. For example, the single thread 200 can indicate a first action and a second subsequent action that depends on resolution of the first action. These actions can be days or weeks (or more) apart from one another, such as buying a plane ticket (first action, today) for a three week tropical beach vacation that will occur six months in the future, and booking scuba lessons for the last day of the vacation (second action, more than six months away). The direct action API 135 can communicate in real time with the service provider computing device 160 corresponding to an airline entity responsive to receipt of the input audio signal to buy the plane tickets in an online action to effect a conversion—the purchase of the plane tickets. The second action in this example remains six months away. Over this six month period or other time window the direct action API 135 or other component such as the content selector component 125 can select content items or perform other operations responsive to the second action (scuba lessons). For example, the direct action API can obtain offline by obtaining this information from the data repository 145 or from a third party data repository relating to scuba lessons. The offline action may or may not be in real time, and an offline action does not require time separation (e.g., six months) between actions. For example, the data processing system 105 can obtain information responsive to actions from the data repository 145 or from a third party database in a real time, as part of a communication session or synchronous or asynchronous conversation with the client computing device.

Figure 4:
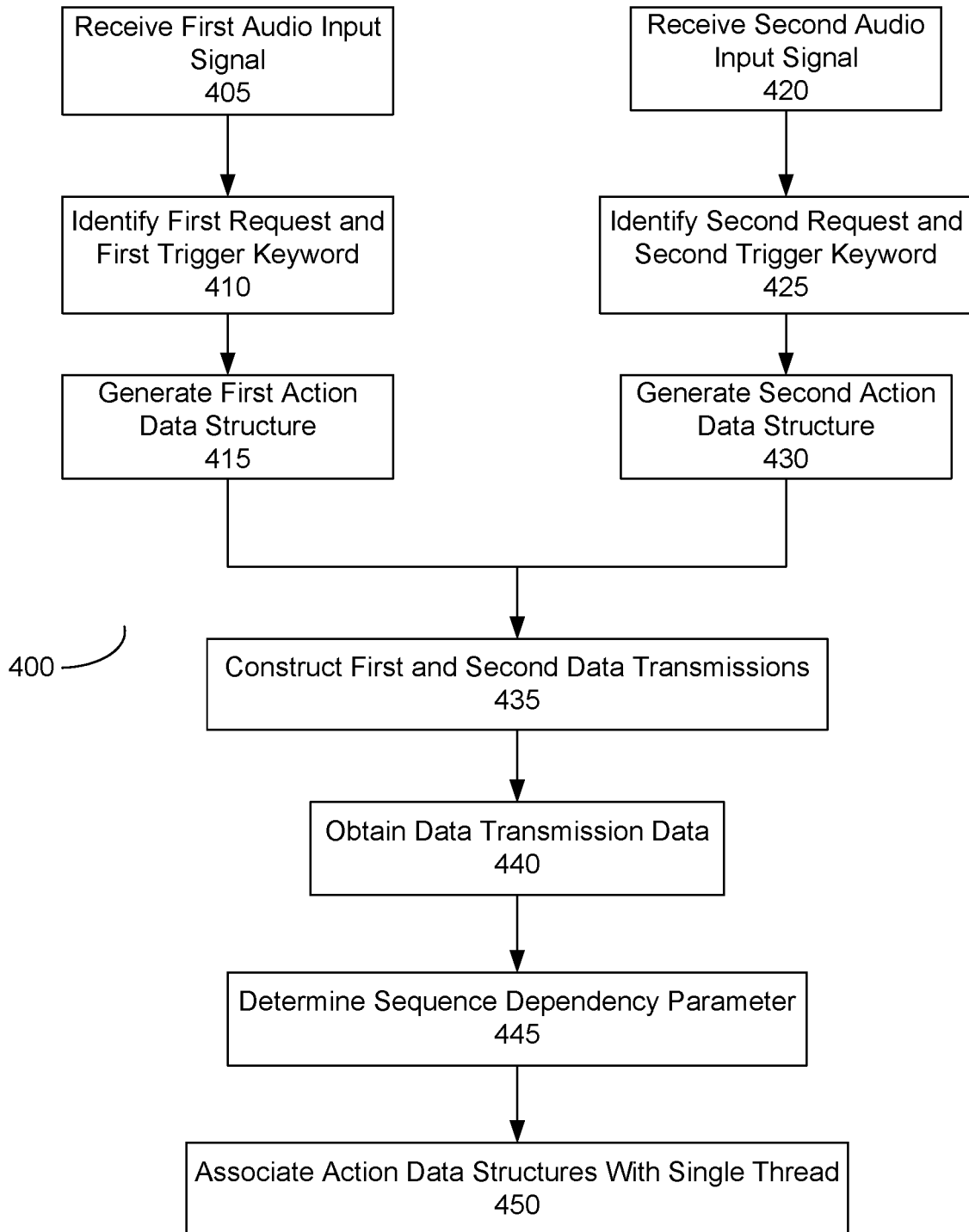
FIG. 4 depicts method to manage multiple voice activated audio input data communications that indicate sequence dependent operations.

FIG. 4 depicts a method 400 to manage voice activated audio input data communications that indicate sequence dependent operations in a voice activated data packet based computer network environment. The method 400 can receive at least one first audio input signal (ACT 405). For example, via the interface 115 the NLP component can receive data packets (ACT 405). The data processing system 105 can execute, launch, or invoke the NLP component 110 to receive packet or other protocol based transmissions via the network from at least one client computing device 150. The data packets can include or correspond to an input audio signal detected by the sensor 151 of a first client computing device 150, such as a first end user saying "OK, I would like to go to go dinner tonight" into the client computing device 150, e.g., a smartphone. The method 400 can parse the input audio signal to identify at least one first request or at least one first trigger keyword from the input audio signal (ACT 410). For example, the NLP component 110 can parse the input audio signal to identify requests (an entertainment request for "dinner") as well as trigger keywords ("to go to") that correspond or relate to the request. The method 400 can generate at least one first action data structure (ACT 415) based on the identified requests or keywords associated with the received first audio input signal. For example, the direct action API 135 can generate an action data structure that indicates a first action, such as a location for a taxi pick-up, a requested service provider, or a restaurant recommendation.

The method 400 can receive at least one second audio input signal (ACT 420). For example, the NLP component 110 can receive packet or other protocol based transmissions via the network 165 from the same or a different client computing device 150 that originated the first input audio signal. The data packets can include or correspond to an input audio signal detected by the sensor 151 of the second client computing device 150, such as an end user saying "OK, I would like to catch a movie later" into the client computing device 150. The method 400 can identify at least one second request or at least one second trigger keyword from the second input audio signal (ACT 425). For example, the NLP component 110 can parse the input audio signal to identify requests (an entertainment request for a "movie") as well as trigger keywords ("to catch") that correspond or relate to the request. The method 400 can generate at least one second action data structure (ACT 430) based on the identified requests or keywords associated with the received first audio input signal. For example, the direct action API 135 can generate an action data structure that indicates a second action, such as a location for a taxi pick-up, a requested service provider, or movie information.

The method 400 can construct data transmissions from the action data structures (ACT 435). For example, the direct action API 135 can create a first data transmission from the first action data structure that corresponds to the first input audio signal, and can create a second data transmission from the second action data structure that corresponds to the second input audio signal. The first and second (or other number of) data transmissions can be constructed or generated (ACT 435) by packetizing information obtained from the corresponding action data structures, or otherwise converting the action data structures into a form for transmission as part of a broadly defined communication session, e.g., a back and forth or asynchronous conversation or transmission of data between the end user computing device 150 and the content provider computing device 155 or the service provider computing device 160 via the data processing system 105. Communication sessions with multiple third party devices (e.g., content provider computing devices 155 or service provider computing devices 160) that correspond to different entities can be considered part of a common communication session. Communication sessions can be synchronous, with back and forth data transmission to and from the client computing device 150 in a conversational matter, or asynchronous where a period of dormancy, e.g., at least one hour, exists between data transmissions.

The method 400 can obtain data from the data transmissions (ACT 440). For example, the thread optimization component 120 can access or retrieve (e.g., from the data repository 145) information regarding actions from the data transmissions (or from the corresponding action data structures). The method 400 can determine at least one sequence dependency parameter (ACT 445). For example, based on data obtained from the data transmissions (ACT 440) that indicate an order of operations or sequence dependency of actions, the thread optimization component 120 can determine a sequence dependency parameter that indicates the existence of a sequence dependency for at least two actions. The method 400 can associate one or more action data structures (directly or via association of corresponding data transmissions) with the single thread data structure 200. For example, the thread optimization component 120 (or other data processing system 105 component) can generate the single thread data structure 200 (ACT 450). For example, based on the indication of at least two sequence or time dependent operations, the thread optimization component 120 can generate at least one single thread data structure that indicates the first and second data transmissions, first and second action data structures, or their associated actions (ACT 440). The generated single thread data structure 200 (ACT 450) can include data used by the direct action API 135 to detect completion of an action, so that to the data processing system 105 can then provide data packets for a different action to the service provider computing device 160 or to the content provider computing device 155. The data processing system 105 can also identify a deadlock condition associated with actions of the generated single thread data structure 200 (ACT 450). The single thread data structure 200 can indicate a sequential order of multiple actions, and the method can generate a modified sequential order that changes the sequential order of the actions. The data processing system 105 can provide all or part of the single thread data structure 200 to one or more content provider computing devices 155 or service provider computing devices 160.

Figure 5:
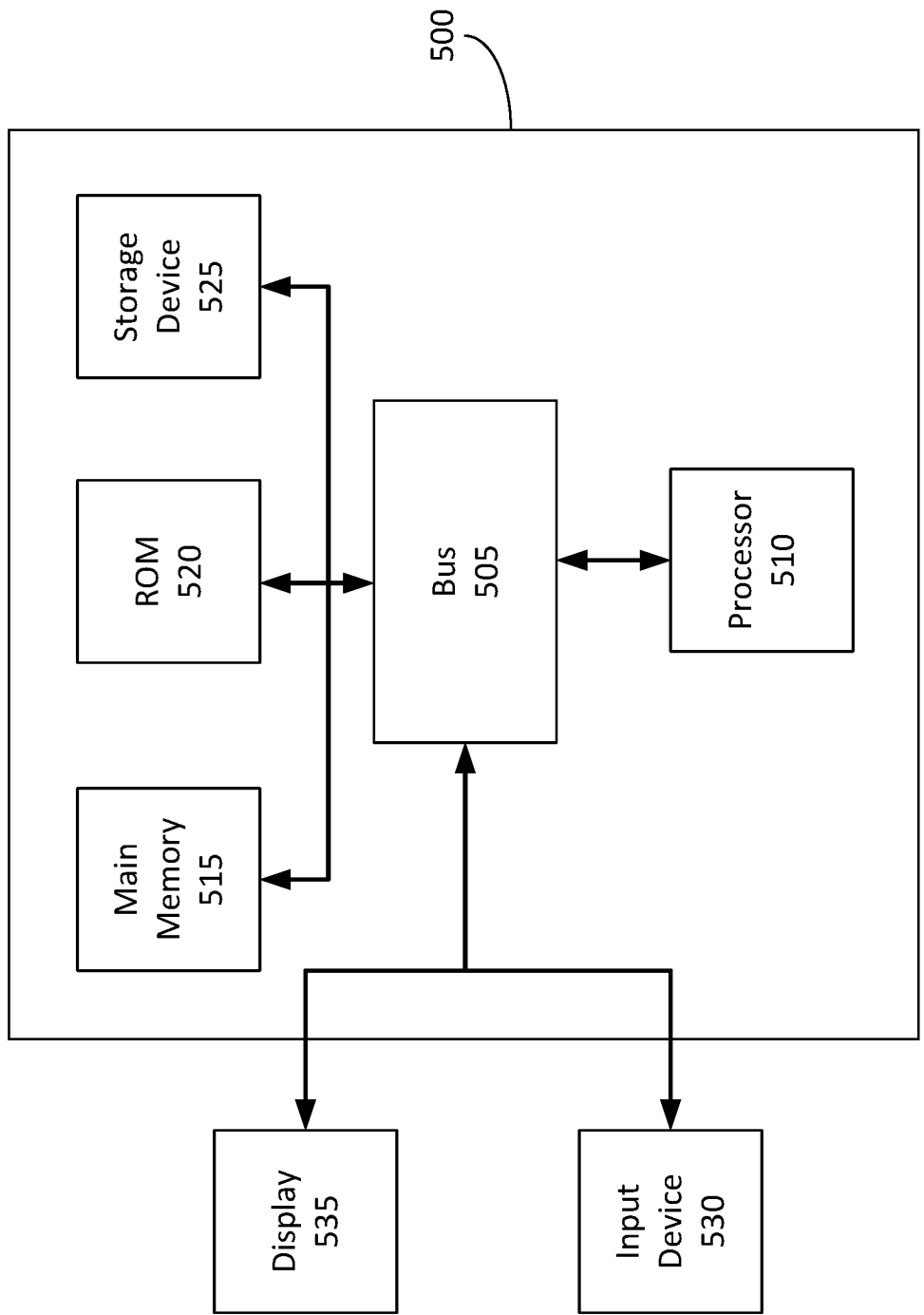
FIG. 5 is a block diagram illustrating a general architecture for a computer system that may be employed to implement elements of the systems and methods described and illustrated herein.

FIG. 5 is a block diagram of an example computer system 500. The computer system or computing device 500 can include or be used to implement the system 100, or its components such as the data processing system 105. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 145. The main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions. The storage device 525 can include or be part of the data repository 145.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 105, the client computing device 150 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The direct action API 135, content selector component 125, thread optimization component 120 or NLP component 110 and other data processing system 105 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a content item) to a client computing device (e.g., for purposes of displaying data to and receiving user input from a user interacting with the client computing device). Data generated at the client computing device (e.g., a result of the user interaction) can be received from the client computing device at the server (e.g., received by the data processing system 105 from the computing device 150 or the content provider computing device 155 or the service provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110, the content selector component 125, or the thread optimization component 120 can be a single component, app, or program, or a logic device having one or more processing circuits, or part of one or more servers of the data processing system 105.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, components of the data processing system 105 need not be separate components, and one component can include other components. Processors of one or more computing devices (e.g., servers) can include or execute components of the data processing system 105. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to combine multiple voice activated audio input data packets that indicate sequence dependent operations, comprising:
    a natural language processor component executed by a data processing system to receive, via an interface of the data processing system, data packets comprising a first input audio signal detected by a sensor of a client computing device;
    the natural language processor component to parse the first input audio signal to identify a first request and a first trigger keyword corresponding to the first request;
    a direct action application programming interface ("API") of the data processing system to:
        generate, based on the first trigger keyword and in response to the first request, a first action data structure; and
        construct a first data transmission including the first action data structure to establish a first communication session between a first service provider computing device and the client computing device, data packets of the first communication session routed from the client computing device to the first service provider computing device via the data processing system;
    the natural language processor component to receive, via the interface of the data processing system, data packets comprising a second input audio signal detected by the sensor of the client computing device, and to parse the second input audio signal to identify a second request and a second trigger keyword corresponding to the second request;
    the direct action API to:
        generate, based on the second trigger keyword and in response to the second request, a second action data structure; and
        construct a second data transmission including the second action data structure to establish a second communication session between a second service provider computing device and the client computing device, data packets of the second communication session routed from the client computing device to the second service provider computing device via the data processing system;
    a thread optimization component executed by the data processing system to:
        obtain data packets of the first data transmission including the first action data structure corresponding to the first trigger keyword identified by the natural language processor component, and to obtain data packets of the second data transmission including the second action data structure including the second trigger keyword identified by the natural language processor component;
        determine, based on a heuristic technique applied to the first action data structure of the first data transmission and the second action data structure of the second data transmission, a sequence dependency parameter indicating that an action associated with the first action data structure generated by the direct action API is scheduled to occur prior to or after an action associated with the second action data structure generated by the direct action API; and
        merge, based on a comparison of the sequence dependency parameter with a threshold, the first data transmission with the second data transmission into a single thread.

2. The system of claim 1, wherein the single thread indicates a first action scheduled to occur prior to a second action, the first action corresponding to the first action data structure and the second action corresponding to the second action data structure, comprising:
    the direct action API to detect a completion of the first action; and
    the interface of the data processing system to transmit the data packets of the single thread to the second service provider computing device subsequent to the completion of the first action.

3. The system of claim 1, wherein the sequence dependency parameter indicates that the action corresponding to the first action data structure is scheduled to occur prior to the action corresponding to the second action data structure.

4. The system of claim 3, comprising:
the direct action API to identify a condition associated with the action corresponding to the second action data structure based on a time associated with the action corresponding to the first action data structure, the condition indicating that the action of the second action data structure cannot proceed until the action of the first action data structure is complete.

5. The system of claim 4, comprising:
the interface of the data processing system to prevent transmission of the data packets of the second communication session to the second service provider computing device responsive to the condition.

6. The system of claim 4, comprising:
the direct action API to obtain an indication of termination of the condition; and
the interface of the data processing system to transmit the data packets of the second communication session to the second service provider computing device subsequent to termination of the condition.

7. The system of claim 1, wherein the single thread indicates sequence dependent actions for the single thread in a sequential order, the sequential order including a first action, a second action subsequent to the first action, and a third action subsequent to the second action, comprising the direct action API to:
receive an indication of the sequential order, and subsequent to receipt of the indication of sequential order, generate a modified sequential order, the modified sequential order including the third action prior to the second action.

8. The system of claim 1, wherein the single thread indicates a series of sequence dependent actions for the single thread, the series of sequence dependent actions including a first action, a second action subsequent to the first action, and a third action subsequent to the second action, comprising:
the direct action API to determine a condition based on a time of completion of the first action, the condition indicating that the second action cannot proceed until the first action is complete;
the direct action API to determine a release of the condition based on completion of the first action; and
a content selector component of the data processing system to identify a content item for the second action, responsive to the release of the condition.

9. The system of claim 1, comprising:
the thread optimization component to identify a series of sequence dependent actions for the single thread.

10. The system of claim 1, comprising:
the direct action API to transmit at least one of the first data transmission and the second data transmission as part of the first communication session subsequent to merger of the first data transmission and the second data transmission into the single thread.

11. The system of claim 1, comprising:
the direct action API to identify a condition related to a sequence of a plurality of actions, the condition indicating that a second action of the sequence of the plurality of actions cannot proceed until a first action of the sequence of the plurality of actions is complete; and
a content selector component of the data processing system to block selection of a content item associated with series of sequence dependent actions for the single thread responsive to the condition.

12. The system of claim 1, comprising:
the thread optimization component to prioritize the second action data structure over the first action data structure.

13. The system of claim 12, comprising a content selector component of the data processing system to:
identify a content item responsive to the second action data structure; and
subsequent to identification of the content item responsive to the second action data structure, identify a content item responsive to the first action data structure.

14. The system of claim 1, comprising:
a content selector component of the data processing system to select a content item responsive to the second action data structure prior to occurrence of the action of the second action data structure.

15. The system of claim 1, comprising:
the direct action API to populate a variable field of at least one of the first action data structure and the second action data structure based on a sequence dependency between a first action and a second action.

16. A method of managing multiple voice activated audio input data communications that indicate sequence dependent operations, comprising:
receiving, by a natural language processor component executed by a data processing system, via an interface of the data processing system, data packets comprising a first input audio signal detected by a sensor of a client computing device;
identifying, by the natural language processor component, from the first input audio signal, a first request and a first trigger keyword corresponding to the first request;
generating, by a direct action application programming interface ("API") of the data processing system, based on the first trigger keyword and in response to the first request, a first action data structure;
constructing a first data transmission including the first action data structure for a first communication session between a first service provider computing device and the client computing device, data packets of the first communication session routed from the client computing device to the first service provider computing device via the data processing system;
receiving, by the natural language processor component, via the interface of the data processing system, data packets comprising a second input audio signal detected by the sensor of the client computing device, and parsing, by the natural language processor component, the second input audio signal to identify a second request and a second trigger keyword corresponding to the second request;
generating, by the direct action API, based on the second trigger keyword and in response to the second request, a second action data structure;
constructing a second data transmission including the second action data structure for a second communication session between a second service provider computing device and the client computing device, data packets of the second communication session routed from the client computing device to the second service provider computing device via the data processing system;
obtaining, by a thread optimization component executed by the data processing system, data of the first data transmission including the first action data structure corresponding to the first trigger keyword identified by the natural language processor component, and data of the second data transmission including the second action data structure including the second trigger keyword identified by the natural language processor component;

determining, based on a heuristic technique applied to the first action data structure of the first data transmission and applied to the second action data structure of the second data transmission, a sequence dependency parameter indicating that an action associated with the first action data structure generated by the direct action API is scheduled to occur prior to or after an action associated with the second action data structure generated by the direct action API; and associating, based on the sequence dependency parameter, the first action data structure and the second action data structure with a single thread.

17. The method of claim 16, wherein the single thread indicates a first action scheduled to occur prior to a second action, the first action corresponding to the first action data structure and the second action corresponding to the second action data structure, comprising:

detecting a completion of the first action; and providing the data packets of the second communication session to the second service provider computing device subsequent to the completion of the first action.

18. The method of claim 16, comprising:

identifying a condition associated with an action of the single thread, the condition indicating that the action cannot proceed until a prior action of the single thread is complete.

19. The method of claim 16, wherein the single thread indicates sequence dependent actions for the single thread in a sequential order, the sequential order including a first action, a second action subsequent to the first action, and a third action subsequent to the second action, comprising:

receiving an indication of the sequential order; and generating a modified sequential order, the modified sequential order including the third action prior to the second action.

\* \* \* \* \*